US008422811B2

(12) United States Patent
Murakata

(10) Patent No.: US 8,422,811 B2
(45) Date of Patent: Apr. 16, 2013

(54) IMAGE PROCESSING APPARATUS

(75) Inventor: Akira Murakata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1286 days.

(21) Appl. No.: 11/752,527

(22) Filed: May 23, 2007

(65) Prior Publication Data

US 2008/0056598 A1 Mar. 6, 2008

(30) Foreign Application Priority Data

Jun. 14, 2006 (JP) .................................. 2006-164464

(51) Int. Cl.
*G06K 9/40* (2006.01)

(52) U.S. Cl.
USPC ........... 382/254; 382/289; 382/296; 382/112; 358/448; 358/488

(58) Field of Classification Search .......... 358/400–498, 358/500–540
See application file for complete search history.

(56) References Cited

U.S. PATENT DOCUMENTS

| 4,533,959 | A | * | 8/1985 | Sakurai | 358/452 |
| 5,650,799 | A | * | 7/1997 | Melen | 345/172 |
| 5,748,344 | A | * | 5/1998 | Rees | 358/505 |
| 6,122,411 | A | * | 9/2000 | Shen et al. | 382/299 |
| 6,771,842 | B1 | * | 8/2004 | Sakai et al. | 382/290 |
| 2005/0117773 | A1 | * | 6/2005 | Kobayashi | 382/100 |
| 2006/0033967 | A1 | * | 2/2006 | Brunner | 358/474 |

FOREIGN PATENT DOCUMENTS

| JP | 04-125791 | 4/1992 |
| JP | 9-200507 | 7/1997 |
| JP | 10-327310 | 12/1998 |
| JP | 11-17892 | 1/1999 |
| JP | 2001-358914 | 12/2001 |
| JP | 2002-111988 | 4/2002 |
| JP | 2003-281469 | 10/2003 |

OTHER PUBLICATIONS

Office Action issued Dec. 9, 2010, in Japanese Patent Application No. 2006-164464 (without English-language Translation).

* cited by examiner

*Primary Examiner* — Chan Park
*Assistant Examiner* — Mark Roz
(74) *Attorney, Agent, or Firm* — Oblon, Spivak, McClelland, Maier & Neustadt, L.L.P.

(57) ABSTRACT

Characteristics of image data from a reading unit are unified for storage. The state of the image data is recognized and retained as auxiliary information. The auxiliary information is checked, and an image skew and the like are detected according to a target output format to perform a correction process. At that time, an optimum image processing path is selected for processing according to the state of implementation of hardware and software. A simple process can be performed at an image processing apparatus, while a complex process is performed at a network-connected PC. Since a unit configuration can be selected according to the purpose of image processing, processing can be performed with a simple configuration at high speed.

16 Claims, 32 Drawing Sheets

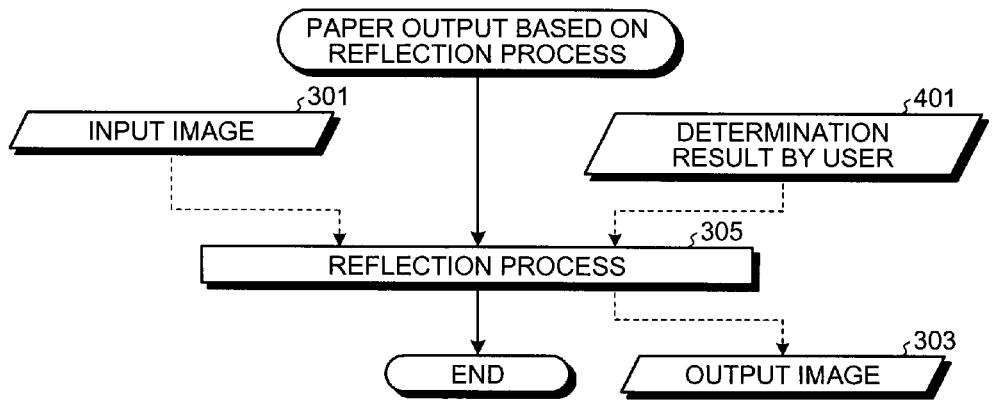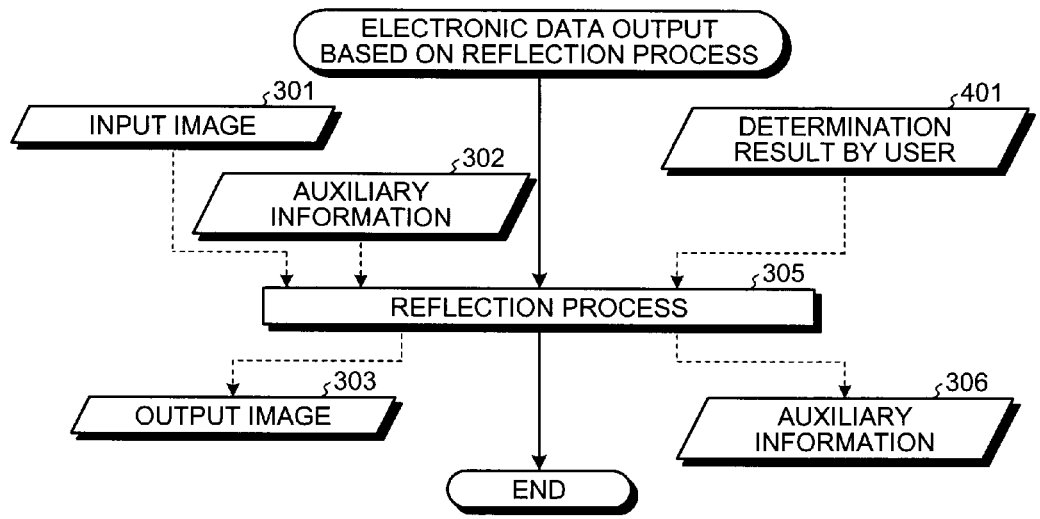

FIG.19

```
TABLE EXAMPLE
const u_char FilA_Tbl[3][2]={
//LENGTH, WIDTH
  { 3, 5},     //VARIATION A
  {10,10},     //VARIATION B
       ;       //VARIATION C
};

const u_short FilB_Tbl[3]={
//STRENGTH
  5,           //VARIATION A
  8,           //VARIATION B
  ;            //VARIATION C
};

const u_char FilC_Tbl[2][10][10]={
  //VARIATION A
  {  5, 20,209,158,183,  0,  0,  0,  0,  0,
    98, 63,183,134,134,  0,  0,  0,  0,  0,
   209,158,  5, 20, 98,  0,  0,  0,  0,  0,
     0,  0,  0,  0,  0,  0,  0,  0,  0,  0,
     0,  0,  0,  0,  0,  0,  0,  0,  0,  0,
     0,  0,  0,  0,  0,  0,  0,  0,  0,  0,
     0,  0,  0,  0,  0,  0,  0,  0,  0,  0,
     0,  0,  0,  0,  0,  0,  0,  0,  0,  0,
     0,  0,  0,  0,  0,  0,  0,  0,  0,  0,
     0,  0,  0,  0,  0,  0,  0,  0,  0,  0,
  },
  //VARIATION B
  { 11, 22,123, 77, 33,214,112,150,207,153,
    77, 33,214, 12,150,207,153, 11, 22,123,
   112,150,207,153, 11, 22,123, 77, 33,214,
   153, 11, 22,123, 77, 33,214,112,150,207,
   123, 77, 33,214,112,150,207,153, 11, 22,
   214,112,150,207,153, 11, 22,123, 77, 33,
   207,153, 11, 22,123, 77, 33,214,112,150,
    22,123, 77, 33,214,112,150,207,153, 11,
    33,214,112,150,207,153, 11, 22,123, 77,
   150,207,153, 11, 22,123, 77, 33,214,112
  },
  //VARIATION C
  {
                                           ;
                                           ;
  }
};
```

FIG.20

```
//PROGRAM CODE SUBSTANCE
const u_long Rip.Lib[]={
/*- PROGRAM A (MAIN SCANNING FILTER)-*/ //VARIATION A
    0x0000040d, 0x0000140d, 0x18030c01, 0x00000000,
    0x0400c010, 0x64c90e00, 0x00000000, 0x38080cc0,
    0x1000c01c, 0xc000c11c, 0x08030c05, 0x04031c05,
    0x00001409, 0x00000409, 0x00000010,
/*- PROGRAM A (MAIN SCANNING FILTER)-*/ //VARIATION B
    0x0000040d, 0x0000c01c, 0x58080c05, 0x02b40c01,
    0x00000000, 0x0300c002, 0xeccb0e00, 0x00000000,
    0x0000c01c, 0x0i00c000, 0x02b40c05, 0xf007c01c,
    0x50b42c01, 0xc2010c05, 0x0100c202, 0x15cc0e00,
    0x00000000, 0xccb01c01, 0x00000000, 0xc6011c05,
    0xe000c01c, 0xc6010c05, 0xbf00c01c,
/*- PROGRAM A (MAIN SCANNING FILTER)-*/ //VARIATION C
    0x0000040d, 0x0000140d, 0x0000240d, 0x0000340d,
    0x0000440d, 0x0000540d, 0x00006404, 0x0000740d,
    0xff3fc01c, 0xc2010c05, 0x00000000, 0xc2010c01,
    0x00000000, 0xff3fc002, 0xb8c90e00, 0x1000c0c1,
    0xce010c05, 0x05000c01, 0x00033c01, 0xc0b00c01,
    0xbab01c01, 0x18030c05, 0x0000c102, 0x05ca0e00,
    0x0000c01c, 0x06020c05, 0x0e033c05, 0x74ca4008,
    0x0100c11e, 0x06021c05, 0x04ca4008, 0x0100c11c,
    0x0000c01c, 0x08021c05, 0x08020c05, 0x08020c05,
    0x08020c05, 0x08020c05, 0x08020c05, 0x08020c05,
    0x08020c05, 0x08020c05, 0x08020c05, 0x08020c05
                                                    ;
                                                    ;
const u_short FilB_Tbl[1][3]={
    //DATA A
        5,              //VARIATION A
        8,              //VARIATION B
        ;               //VARIATION C
    };
```

INPUT IMAGE

SEPARATED DATA

IMAGE PROCESSING APPARATUS

CROSS-REFERENCE TO RELATED APPLICATIONS

The present document incorporates by reference the entire contents of Japanese priority document, 2006-164464 filed in Japan on Jun. 14, 2006.

BACKGROUND OF THE INVENTION

1. Field of the Invention

The present invention relates to image processing apparatuses and, particularly, to an image processing apparatus that recognizes the state of an image to perform a correction process including upside/downside identification and skew correction.

2. Description of the Related Art

Conventional analog copiers have been changed to digital copiers using digitized image data to produce copy. Such digital copiers have an increased affinity with other apparatuses handling digital image data. With not only the functions as copiers but also various functions, such as facsimile, printer, and scanner functions, being combined, these copiers have been not merely taken as simple digital copiers but have been called digital multifunctional peripherals (MFPs). With an increased capacity and a decreased cost of memory, a function of changing a paper document to digital image data has advanced. Technologies associated with MFP devices have also been advancing. High-speed network has been widespread, the process performance of Central Processing Units (CPUs) has been increased, and compression technologies associated with digital image data and others have been advancing. Accordingly, the variety of functions incorporated in the MFP devices has also been increased. Furthermore, in recent years, the variety of use of the MFP devices has been increased. In an increasingly-used scheme, digital image data is accumulated and stored inside the MFP device and the data is output again when this information is required.

MFP devices have been diversified into a small size to a large size. There is a small MFP device set on a personal computer (PC) side and allowing an operator to easily use facsimile, printer, and scanner functions. Also, there is a middle-sized MFP device shared among a plurality of persons for each department and section and allowing sorting, punching, and stapling functions to be used with productivity to some extent. In a section centrally in charge of copy-related tasks within a company or a company whose core business is copy-related tasks themselves, a large MFP device with high productivity, high quality, and multifunction is used.

Although there are functions shared among every class, there are also functions strongly required for each class. For example, large-sized MFP devices require post-processing on paper after plotting, such as punching, stapling, and paper folding, and electronic filing together with copying tasks. Small-sized MFP devices require expansion of Internet fax, PC fax, and the like, and high-quality image printing on dedicated paper for personal use. For each of such diversified MFP devices, a system with a set of functions required for each class is constructed.

Meanwhile, in a reading device of an MFP device, a document may be read in a tilted state. For example, the document may be tilted when the document is conveyed by using a document feeder (DF) often used at the time of printing a large amount of document. As a result, electronic data of the read image is tilted, causing an image printed on paper to be also tilted. When digital data is subjected to optical character recognition to be converted to text data, such a tilt degrades a recognition rate. Moreover, when a user sets the document without being aware of which side is upside or downside of the document, the upside and downside of electronic data is as being read, which causes a mixture of upside-down printing results. When the MFP devices are used for business purpose, to correctly arrange the upside and downside of the document, the user has to arrange the upside and downside by himself or herself.

To solve such inconveniences, there is an MFP device provided with a function of recognizing the upside and downside of a document for correction and detecting a tilt of a document for correction to eliminate the user's need of being aware of a tilt of the document. Also, the upside and downside is automatically detected and rotated by a PC optionally connected to the MFP device, and a tilt angle of the document is determined to correct the tilt. In the following, examples of conventional technologies associated with such MFP devices are explained.

Japanese Patent Application Laid-Open No. 9-200507 discloses an "image reading apparatus" in which a tilt is detected in a document read by an automatic document feeder (ADF) for correction. Tilt correction is performed by an ADF mechanism on a tilt of the document with respect to a scanner unit. The document is sequentially converted to image information for each line in a main scanning direction, and an automatic document feeder mechanism (ADF mechanism) is used to move the document in a sub-scanning direction. By using a carrier sheet having an identification frame for detecting a tilt angle $\theta$ of the document with respect to the scanner unit, the tilt angle $\theta$ in the document scanning direction is detected and then stored. By using the stored tilt angle $\theta$, the position of the image information is corrected. With the tilt angle $\theta$ in the document scanning direction due to a mechanical shift of the scanner unit or the like being detected and retained, the tilt angle $\theta$ of the image data is subjected to tilt correction for output when the document is again read.

Japanese Patent Application Laid-Open No. 10-327310 discloses an image reading apparatus in which image data corrected according to a tilt of the document can be output. This image reading apparatus can prevent a loss of image data near the edge of the document in image data to be output, thereby increasing convenience of image data to be output. Image data including the entire image surface of the document is read and stored. A rectangle that specifies a mounting position of image data and a document of a standard size is displayed. The image data is then transferred from an image reading and storage unit to an image displaying unit. The image data is then corrected according to a tilt of the edge portion of the document crossing one side corresponding to one side of the rectangle. The image data corrected by a data correcting unit is then output.

Japanese Patent Application Laid-Open No. 11-0717892 discloses an "image processing apparatus" in which a correction process is performed according to a tilt of a document surface with respect to a reading unit, thereby obtaining an excellent image without skewness. A read surface of a document and the reading unit that reads the read surface are tilted by a specified angle, and image information entered from an input unit is processed. A correction at the time of image processing is performed according to a specified angle, which is a tilt between a document movement reading direction and the reading unit. A correction process according to a tilt between the document surface and the reading device is performed.

Japanese Patent Application Laid-Open No. 2001-358914 discloses an "image reading apparatus" in which skew detection is included in a reading device itself, and a correction process is performed based on the detection results. A skew of a document is determined based on an output of a line sensor that reads an image on a document, thereby correcting a skew of image data. In the image reading device, when a charge-coupled device (CCD) receives reflected light of light emitted toward the document and reads the image on the document, an image processing unit performs a document-size detection process in which a position and width of the document is detected from an output of the CCD. Based on the detection results, a skew, which is a tilt of the document, is determined by a CPU. Based on the determined skew, the tilt of image data of the read document is corrected by the image processing unit under the control of the CPU. Therefore, without requiring provision of a new detecting unit, a skew of the document can be detected based on the reading results of the CCD that reads the image on the document, and the tilt of the image data can be corrected according to the skew of the document.

Japanese Patent Application Laid-Open No. 2002-111988 discloses an "image processing apparatus" in which a second image processing unit that performs image processing on accumulated and stored image data is provided. This can easily achieve high-quality image processing, and increases image processing speed. Also, this can achieve high-quality image processing and increased processing speed over the entire processing system. A first image processing unit is provided that processes image data provided from an image input unit, an FCU, and a PC. An image bus management CDIC that collectively manages image data transmission and reception with respect to IPP over a data bus is provided. Also provided is a memory management IMAC that collectively manages transmitting and receiving accesses with respect to memory over the data bus. Furthermore, provided is the second image processing unit in which an access to the memory is managed by the memory management IMAC and image data processing can be performed by accessing data on the memory. This image processing apparatus also includes a dedicated path for a second IPP2 to directly access the memory for reading and writing data.

Japanese Patent Application Laid-Open No. 2003-281469 discloses a "document image processing method" in which a tilt of an image and a document direction can be determined irrespective of a brightness-reversed state in which a bright character is present in a dark background on an image with multilevel image data, and effective information as information for character recognition processing is output. A gray image is generated from an input multilevel image to generate a binary image A. Then, a tilt of the image and a direction of the image are detected to determine whether the tile and direction are successfully detected. When detection is successful, the angle of the image is corrected. When detection is failed, on the other hand, a gray image with brightness being reversed is generated to generate a binary image B. Then, a tilt and direction are detected again to generate an angle-corrected image. With this, the tile and direction of the image can be accurately detected and corrected irrespectively of the presence or absence of brightness reversion.

However, conventional image correcting methods and others have the following problems. When digital image data accumulated and stored inside an MFP device is again output, it is difficult to use the digital image data with optimum image quality according to the use purpose. For example, digital image data stored at the time of copying is transmitted through facsimile, if skew correction is performed to enhance a character portion, the image quality may be inappropriate for facsimile. Also, if a high-precision correcting unit is provided to an MFP device or an optional PC, an image correcting process optimum to all use purposes can be performed, but this merely costs users who do not aim at such use purposes and becomes a burden to the users. Moreover, for correction process other than skew correction, it is impossible for the conventional methods to achieve an optimum image according to the use purpose.

SUMMARY OF THE INVENTION

It is an object of the present invention to at least partially solve the problems in the conventional technology.

According to an aspect of the present invention, an image processing apparatus includes a first image data processing unit that processes an image quality of image data output from an image reading unit so that the image quality matches with a predetermined unified standard and generates input image data with a predetermined image quality and auxiliary information thereof; a memory unit that accumulates the input image data and the auxiliary information; a second image data processing unit that processes the input image data and the auxiliary information to generate output image data suitable for a target output unit; and an external interface unit that connects a client information processing apparatus via a network. The second image data processing unit includes an image recognizing unit that recognizes a state of the input image data and outputs the recognition result, a reflecting unit that performs a reflection process in which the recognition result is reflected on the input image data, and a switching unit that switches contents and a procedure of the reflection process according to the recognition result and a unit configuration.

According to another aspect of the present invention, an image processing system includes an image processing apparatus having a first image data processing unit, a memory unit, and a second image data processing unit; and a client information processing apparatus connected to the image processing apparatus via a network. The first image data processing unit includes a unit that processes an image quality of image data output from an image reading unit so that the image quality matches with a predetermined unified standard and generates input image data with a predetermined image quality and auxiliary information thereof, the memory unit includes a unit that accumulates the input image data and the auxiliary information, the second image data processing unit is a unit that processes the input image data and the auxiliary information to generate output image data suitable to a target output unit, and includes an image recognizing unit that recognizes a state of the input image data and outputs the recognition result, a reflecting unit that performs a reflection process in which the recognition result is reflected on the input image data, and a switching unit that switches contents and a procedure of the reflection process according to the recognition result and a unit configuration, and the client information processing apparatus includes a unit that receives the input image data and the auxiliary information from the image processing apparatus, a client image recognizing unit that recognizes a state of the input image data and outputs the recognition result, and a client reflecting unit that reflects the recognition result on the input image data, and a unit that transmits the reflection result to the image processing apparatus.

According to still another aspect of the present invention, an image processing method comprising processing an image quality of image data output from an image reading unit so that the image quality matches with a predetermined unified standard, generating and accumulating input image data with a predetermined image quality and auxiliary information thereof, and processing the input image data and the auxiliary information to generate output image data suitable for a target output unit; and a state of the input image data is recognized for output of the recognition result, contents and a procedure of a reflection process are switched according to the recognition result and a unit configuration, and the recognition result is reflected on the input image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5 to 8 are flow diagrams of procedures at a client PC network-connected to the image processing apparatus according to the first embodiment of the present invention and flow diagrams of procedures of a reflection process upon user instruction;

FIGS. 19 and 20 are a reference example of register setting values to be downloaded to an ASIC and a reference example of an image processing program to be downloaded to a DSP of the image processing controlling unit of the image processing apparatus according to the fourth embodiment of the present invention;

DETAILED DESCRIPTION OF THE PREFERRED EMBODIMENTS

Exemplary embodiments for implementing the present invention are explained with reference to FIGS. 1 to 36.

An image processing apparatus according to a first embodiment of the present invention is such that a first image data processing device unifies characteristics of image data from an image reading device for storage in a hard disk drive (HDD) as input image data and auxiliary information, a second image data processing device performs a process of recognizing image data and a reflection process, such as correction of the image data, on the input image data and auxiliary information read from the HDD to transmit the image data and the auxiliary information to a network-connected client PC, and the client PC is allowed to determine whether to perform a recognition process and a reflection process based on the presence or absence of the recognition results.

Figure 1:
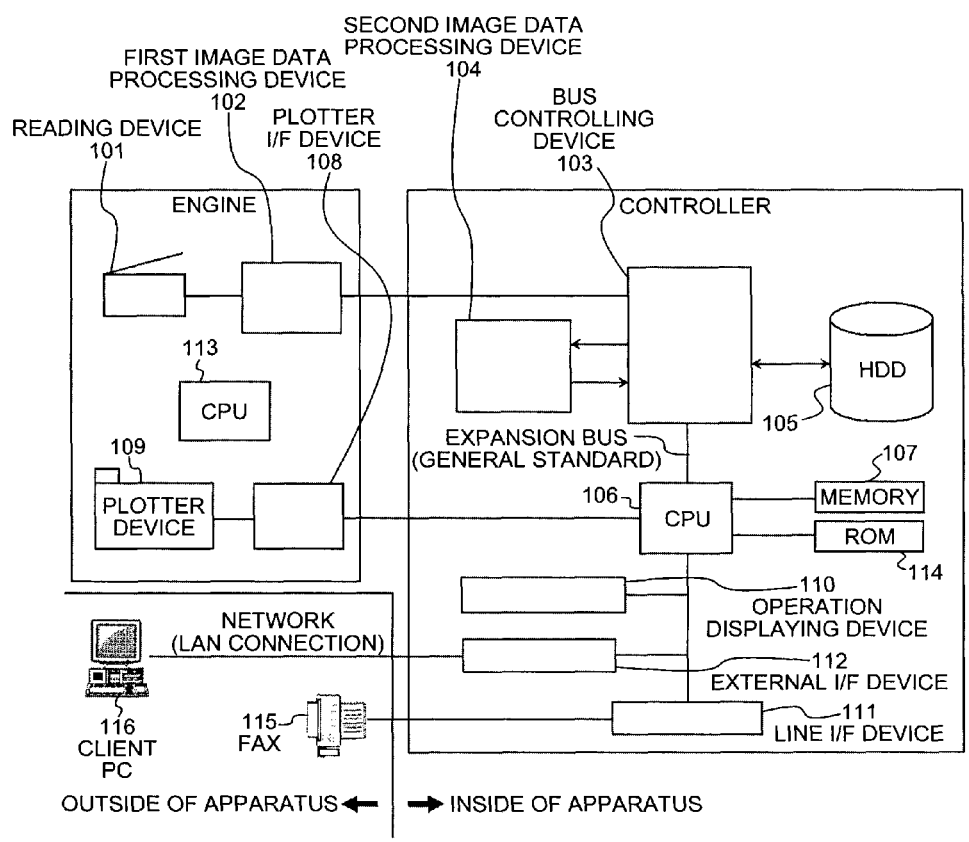
FIG. 1 is a conceptual diagram of the configuration of an image processing apparatus according to a first embodiment of the present invention and FIGS. 2 to 4 are flow diagrams of procedures of a second image data processing device.
Figure 2:
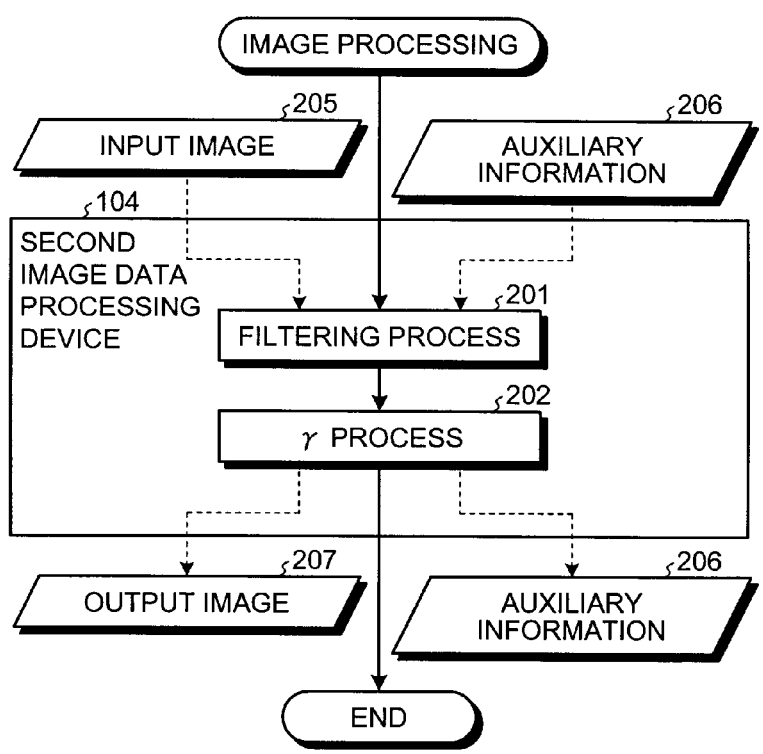
Figure 3:
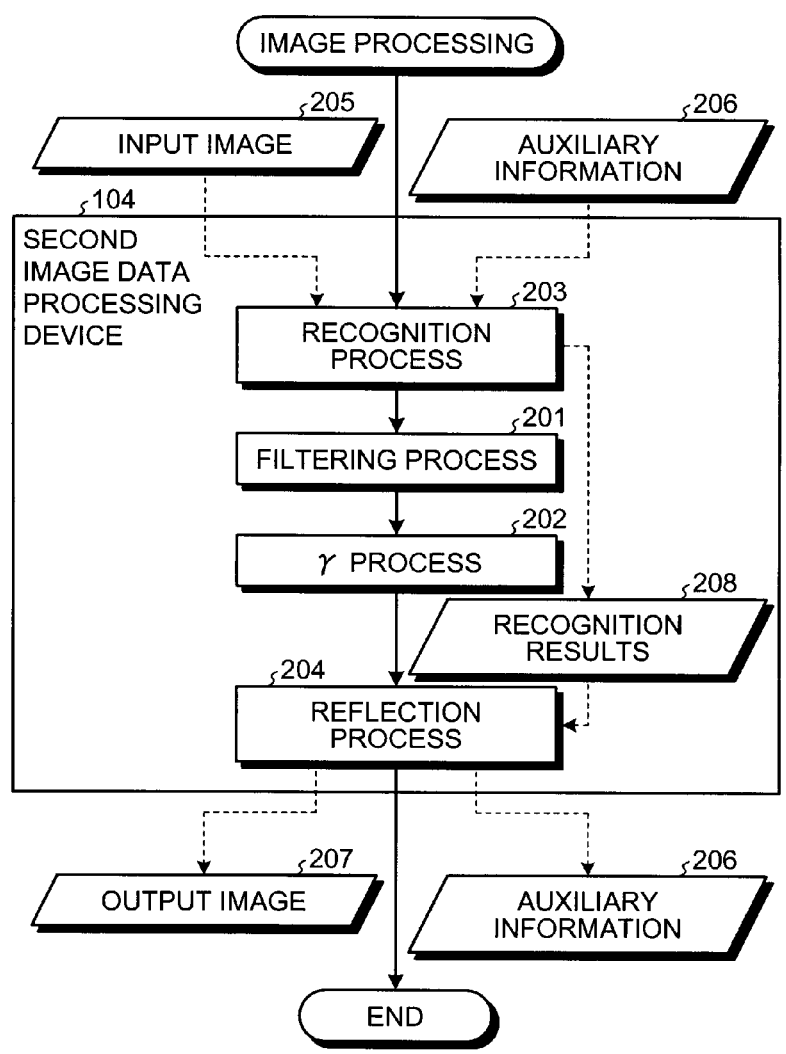
Figure 4:
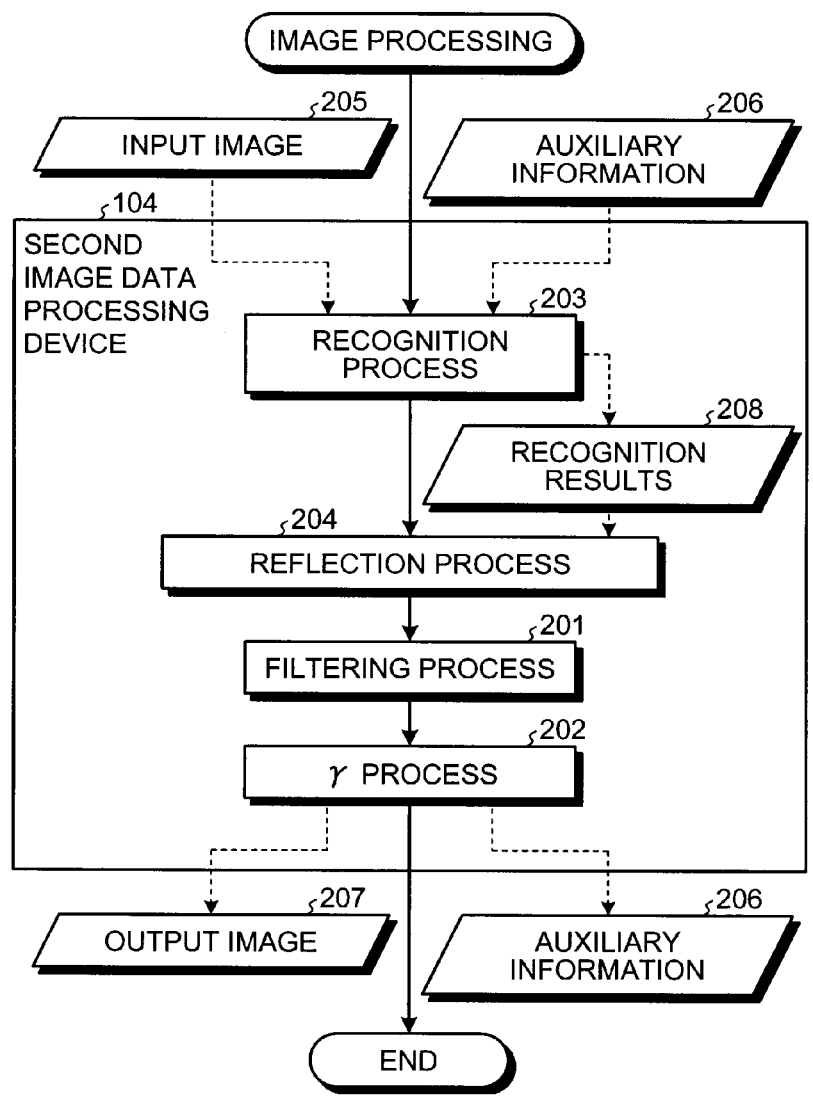

FIG. 1 is a conceptual diagram of the configuration of the image processing apparatus (MFP device) according to the first embodiment of the present invention and FIGS. 2 to 4 are flow diagrams of procedures of a state recognition process and a reflection process performed by the second image data processing device. FIGS. 5 to 8 are flow diagrams of procedures at the network-connected client PC, and flow diagrams of procedures of a reflection process upon user instruction.

In FIG. 1, a reading device 101 is a device that optically reads a document and outputs electronized image data. A first image data processing device 102 is a device that processes image data from the image reading device. A bus controlling device 103 is a device that connects the respective devices together. A second image data processing device 104 is a device that processes image data from a memory device. An HDD 105 is a hard disk device. A central processing unit (CPU) 106 is an operation controlling device for overall management. A memory 107 is a device that accumulates image data and its auxiliary information.

A plotter interface (I/F) device 108 is a device that connects the CPU and a plotter device. A plotter device 109 is a device that prints image data on a transfer sheet. An operation displaying device 110 is a touch panel for operation, for example. A line I/F device 111 is a device that connects a telephone line or the like. An external I/F device 112 is a device that transmits and receives an external device and image data. A CPU 113 is an operation controlling device for printer engine control. A Read-Only Memory (ROM) 114 is a non-volatile memory that retains fixed data. A FAX 115 is an external facsimile device. A client personal computer (PC) 116 is a personal computer connected via a network.

The function and operation of the image processing apparatus according to the first embodiment of the present invention configured as explained above are explained. It is assumed that a state recognition process of the MFP device and the client PC include upside/downside identification and skew detection. Examples of other state recognition processes include OCR, noise recognition in image data, color balance recognition, and shape distortion recognition. Examples of the reflection process include generation of a Portable Document Format through making text, prevention of unauthorized copy, compression process, shape correction, noise elimination, and color correction. The present invention can be similarly applied to these processes. For upside/downside identification and skew correction, a known technology (refer to Japanese Patent Application Laid-Open No. 2003-281469, for example) is used as it is, and therefore a detailed explanation of its algorithm is omitted herein. Other state recognition processes and reflection processes are also within known technologies, and therefore are not explained herein.

First, with reference to FIG. 1, the summary of the function of the image processing apparatus is explained. The reading device 101 includes a line sensor formed of CCD optical-electrical converting elements, an analog-to-digital (A/D) converter, and driving circuit therefor. The reading device 101 scans a set document to obtain density information of the document, and then generates digital image data with eight bits for each of RGB for output. The first image data processing device 102 unifies digital image data form the reading device 101 into data of a predetermined characteristic. The characteristic of the reading device 101 is not variable and its output characteristic is predetermined, and therefore a predetermined image process is performed by an application-specific integrated circuit (ASIC), which is a dedicated image processing circuit. The flow of the image data is controlled by the CPU 113 for control, thereby controlling the ASIC of the image processing circuit. The plotter I/F device 108 and the plotter device 109 are collectively called an engine unit, and the entire engine unit is managed by the CPU 113.

The bus controlling device 103 is made as an ASIC, exchanging various data, such as image data and control commands required in the digital image processing apparatus. The bus controlling device 103 also has a bridge function of connecting buses of a plurality of types with different standards. The first image data processing device 102, the second image data processing device 104, and the CPU 106 are connected through a Peripheral Component Interconnect (PCI) bus or a PCI-Express bus. The HDD 105 is connected via an Advanced Technology Attachment (ATA) bus. The second image data processing device 104 performs an image process on digital image data with its characteristics being unified to a predetermined characteristic by the first image data processing device 102, the image process suitable for an output destination specified by the user to output them. Since the characteristics of the input image data in the second image data processing device 104 have been unified, a recognition process is performed at a stage prior to the image process suitable for the output destination and, depending on the results, required processes are performed at subsequent stages.

The HDD 105 is a large storage device that stores electronic data for use also in a desk top personal computer. In the digital image processing apparatus, digital image data and its auxiliary information are mainly stored. A hard disk with ATA bus connection standardized by extending Intelligent Drive Electronics (IDE) is used. The CPU 106 is a microprocessor in charge of controlling the entire digital image processing apparatus. Performed by using this CPU 106 are sequence management for the entire control, management of requests to each device, hardware setting management, timing management, management of tasks for a plurality of user requests, and image processing through software of the second image data processing device 104. The memory 107 is a volatile memory that temporarily stores a program, intermediate processing data, and image data when the CPU 106 executes a program. With an object oriented program, object data obtained by objecting for each control unit is stored, and a control process is performed according to a user request and each object's duty.

The bus controlling device 103, the second image data processing device 104, the HDD 105, and the memory 107 are included in a controller unit. The ROM 114, the operation displaying device 110, the line I/F device 111, and the external I/F device 112 are also included in the controller device. These are controlled by the CPU 106 that controls the controller. The plotter I/F device 108 follows a print request from the CPU 106 to perform a bus bridge process of outputting, upon receiving, digital image data formed of C, M, Y, and K colors sent through a general standard I/F to a dedicated I/F of the plotter device 109. The general standard I/F is a PCI or PCI-Express bus. Upon receiving digital image data formed of C, M, Y, and K, the plotter device 109 uses an electrophotographic process using a laser beam to output the received image data onto a transfer sheet. The plotter I/F device 108 and the plotter device 109 are included in an engine unit.

The ROM 114 is a memory having stored therein a control program for the CPU 106 to control the digital image processing apparatus. Also stored are image processing assembler code for middleware (digital signal processor DSP) in the second image data processing device 104 and image processing parameters for image processing, such as a filtering process and a γ process. When image processing is performed at the DSP, the assembler code and the image processing parameters stored in advance in the ROM 114 are downloaded for use. The operation displaying device 110 is a portion for an interface between the digital image processing apparatus and a user. The operation displaying device 110 includes a liquid crystal displaying device (LCD) and a key switch, displaying various states and operation schemes of the devices on the LCD and detecting a key switch input from the user. The operation displaying device 110 connects to the CPU 106 via a PCI or PCI-Express bus, and supports copy, scanner, HDD accumulation, and FAX transmission. The line I/F device 111 is a device connecting the PCI or PCI-Express bus and a telephone line. With this device, the digital image processing apparatus can exchange various data via the telephone line. The FAX 115 is a normal facsimile machine, and receives image data from the digital image processing apparatus via the telephone line.

The external I/F device 112 is a device that connects the PCI or PCI-Express bus and an external device. With this external I/F device 112, the digital image processing apparatus can exchange various data with an external device. An IP address is assigned to an MFP device side, and the external I/F device 112 has connected thereto a Local-Area Network (LAN) via Transmission Control Protocol/Internet Protocol (TCP/IP) connection. The client PC 116 is a so-called personal computer. Via application software and drivers installed in the personal computer, the user performs scanner reading with a Twain driver, and also performs printout. The client PC has installed thereon application software in conjunction with the MFP device. This application software analyzes the recognition results at the MFP device and switches the contents and procedure of the reflection process according to the analysis results.

Next, with reference to FIGS. 2 to 4, the case is explained where the second image data processing device 104 performs a state recognition process and a reflection process. In the case of a copy operation, digitalized image data is obtained at the reading device 101. The image data is converted by the first image data processing device 102 to image data unified to a certain characteristic (color space, for example). An input image to the second image data processing device 104 is digital image data unified by the first image data processing device 102. Auxiliary information 206 is auxiliary information of an input image 205. This auxiliary information includes, for example, operation instruction input information at the operation displaying device 110 (for example, document mode, scaling, and image size) and separated data corresponding to each pixel of image data (character/photograph/dots). The separated data is generated at the first image data processing device 102.

FIG. 2 is a flow diagram of a basic process configuration in which a filtering process and a γ process are performed as a conventional technology. For print output, a filtering process (step 201) and a γ process (step 202) are performed. Image processing is performed so as to be optimal to the plotter device 109, and an output image 207 and the auxiliary information 206 are output. The auxiliary information 206 is used for switching image processing parameters between the filtering process (step 201) and the γ process (step 202). A recognition process (step 203) or a reflection process based on the results of the recognition process (step 204) is not performed. To this basic process configuration, the recognition process (step 203) and the recognition process (step 204) are added.

By independently providing two processing units, that is, a processing unit for the recognition process (step 203) and a processing unit for the reflection process (step 204), as depicted in FIGS. 3 and 4, the process configuration can be changed. In the character recognition process, the input image 205 and the auxiliary information 206 are used to recognize the amount of characteristic of the image to obtain recognition results 208. In the recognition process (step 204), based on these recognition results 208, a reflection process is performed on the input image 205 and the auxiliary information 206, such as separated data. To avoid an influence of a change in image quality through the reflection process (step 204) onto the filtering process (step 201) and the γ process (step 202), the process configuration depicted in FIG. 3 is adopted herein.

Figure 5:
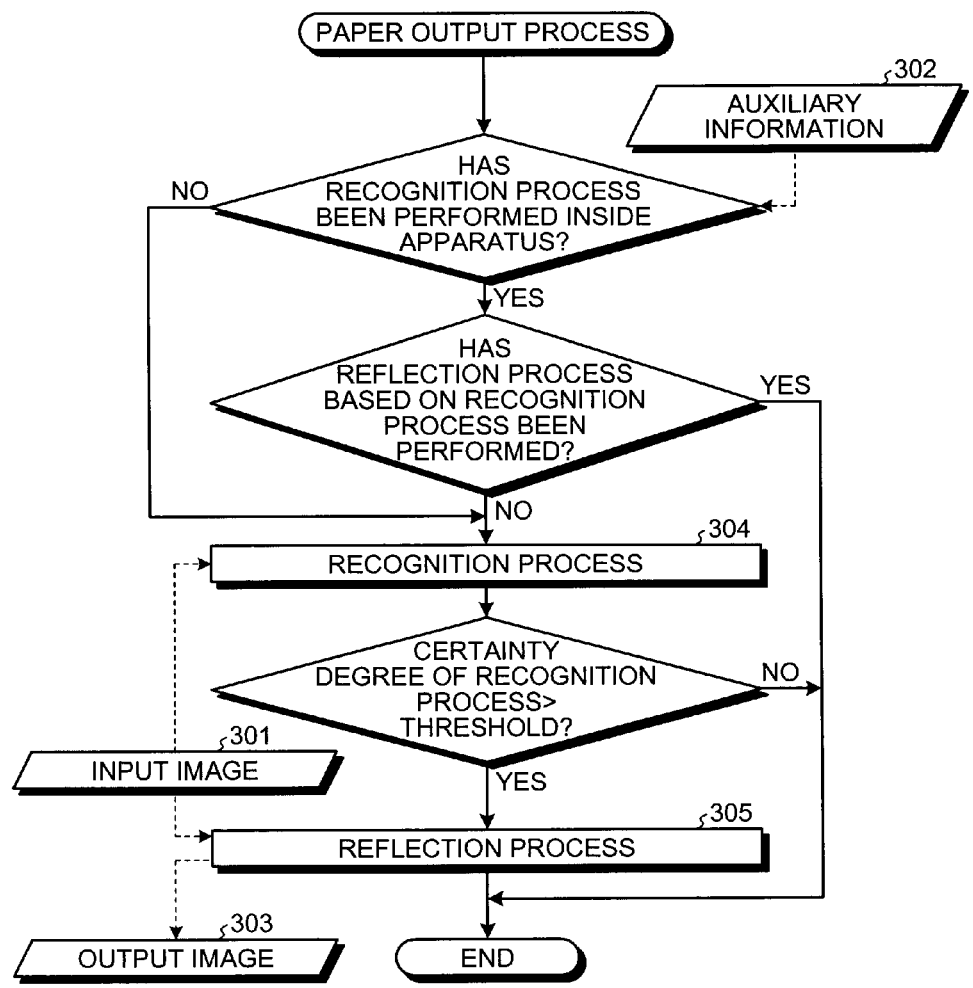
Figure 6:
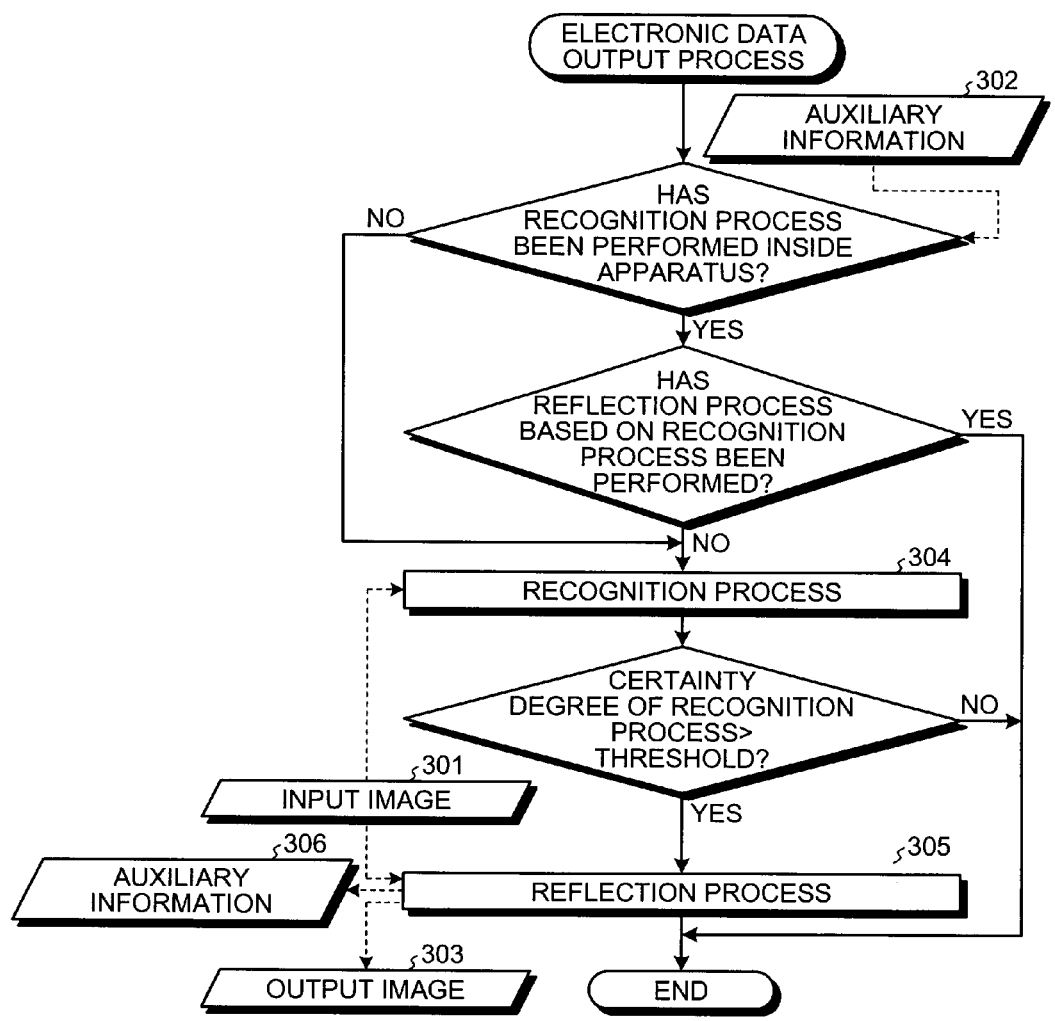

With reference to FIGS. 5 to 8, the operation procedure of the network-connected client PC is explained. FIGS. 5 to 8 depict process flows in which an input image 301 and auxiliary information 302 electronically distributed from an MFP device capable of a recognition process is distributed to the network-connected client PC 116 and then a recognition process is selected by the client PC 116. When a recognition process is not selected, in both of FIG. 5 and FIG. 6, the input image and the auxiliary information are output as they are. A difference between FIG. 5 and FIG. 6 is that the output results are output on paper in FIG. 5 whilst the output results are stored as electronic data in an HDD as a secondary storage device of the client PC 116. In FIG. 5, the output results are output on paper via the MFP device or another printer. In FIG. 6, the recognition process results are reflected also on the auxiliary information 302. In the case of the electronic data output of FIG. 6, the results of the recognition process performed on the MFP device side and the results of the recognition process performed at the client PC 116 are stored. With the previous recognition results being stored in the auxiliary information 302, even if the client PC 116 requests a recognition process, the recognition process is not performed again if the process has been already completed.

By taking electronic data output depicted in FIG. 6 as an example, a recognition processing unit installed in the client PC 116 is explained. First, whether the recognition process has been performed at the MFP device side and whether the recognition process has been reflected are checked by referring to the auxiliary information 302. If the ensured recognition results have been obtained at the MFP device side and the recognition process has been reflected on the input image 301, there is no need to perform a recognition process for reflection at the client PC 116, and therefore the input image 301 is output as it is as an output image 303, and auxiliary information 306 is directly output. In this case, the auxiliary information 306 is identical to the input auxiliary information 302. A recognition process is performed on the client PC 116 side only if a recognition process is not performed at the MFP device side or a recognition process has been performed but the recognition results are not ensured and therefore a reflecting process is not performed (step 304). The ensured recognition results are those with a certainty degree of recognition is equal to or greater than a threshold. The certainty degree is a known technology, and therefore is not explained herein. Since the CPU, memory, and HDD mounted on the client PC often has a higher performance compared with the CPU 106, the memory 107, and the HDD 105 mounted on the MFP device, a recognition process (step 304) with higher accuracy than that of the MFP device can be performed.

Specifically, for example, a character recognition process is performed by using OCR to perform an upside/downside identification process and a skew detection process. For an OCR process, a huge amount of calculation and dictionaries are required. However, by using the CPU, memory, and HDD of the client PC 116, such a process can be sufficiently supported. After performing a highly-accurate recognition process (step 304), certainty of the recognition process is checked. If the recognition process results are not ensured even though a highly accurate recognition process (step 304) has been performed, there is a high possibility of a problem of the contents of the image, such as no document image. Therefore, an output is produced as it is without performing a recognition-result reflecting process (step 305). If the recognition results are ensured, the recognition-result reflecting process (step 305) is performed according to the recognition results output in the recognition process (step 304) for output. Then a recognition process (step 304) is performed on the auxiliary information 306 at the client PC 116 side, and the results of the recognition-result reflecting process (step 305) are stored. If the recognition results at the MFP device side are incorrect and the recognition results are not correctly reflected, a recognition process (step 304) can be performed again at the client PC 116 side.

Figure 10A:
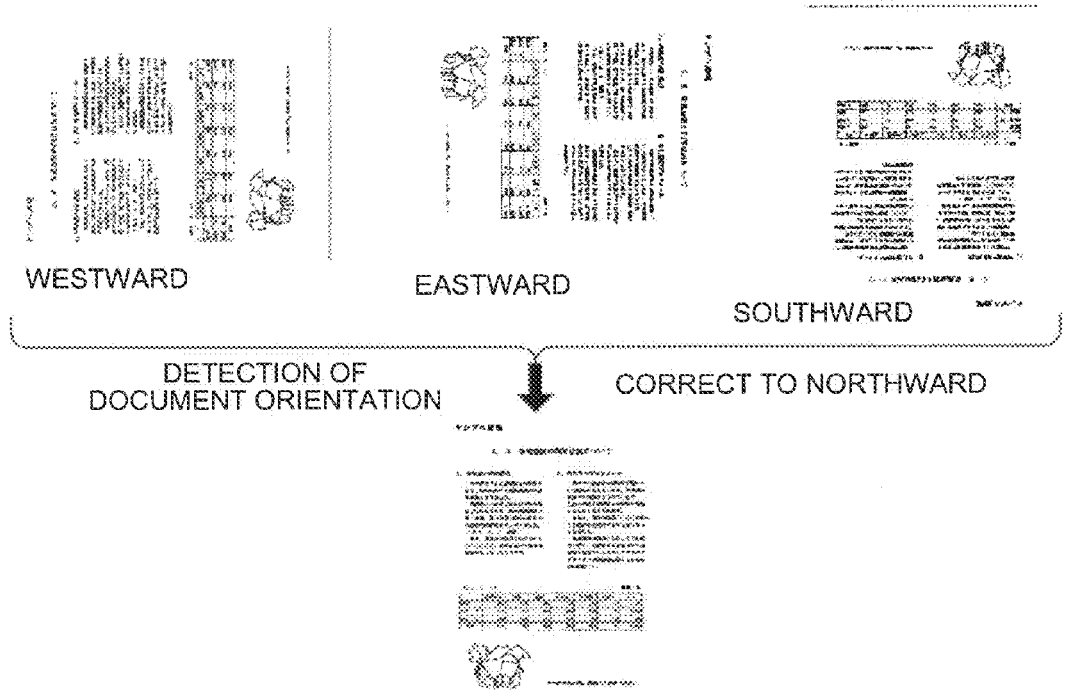
FIG. 10A is a drawing of an input/output example of an upside/downside identification process and an upside/downside correction process and FIG. 10B is a drawing of an input/output example of a skew detection process and a skew correction process.
Figure 10B:
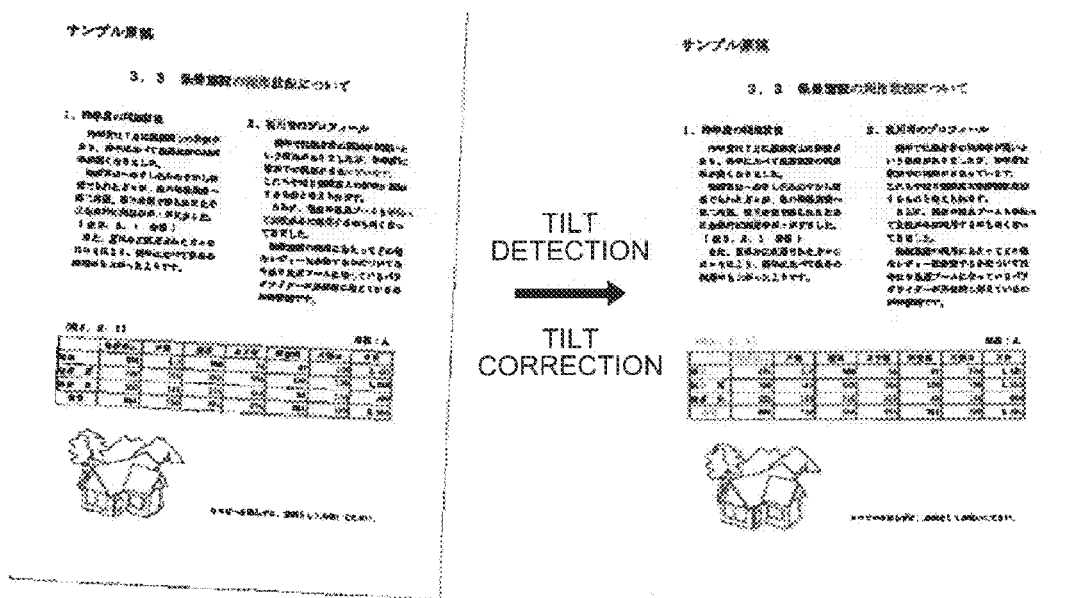

Next, with reference to FIGS. 7 and 8, a method of the user manually setting data corresponding to the recognition result to cause the recognition-result reflecting process (step 305) is explained. FIG. 10A and FIG. 10B depicts a flow of a reflection process upon user instruction. The process to be preformed by the client PC 116 is only the recognition-result reflection process (step 305). The recognition process is not automatically performed, and a determination result by the user 401 is manually entered by the user. With the determination result by the user 401 being taken as the recognition results, the recognition-result reflecting process (step 305) is performed. A difference between paper output in FIG. 7 and electronic data output in FIG. 8 is identical to the difference between FIG. 5 and FIG. 6. In the case of electronic data output, the reflection process is performed also on the auxiliary information 302 and the result is stored as the auxiliary information 306.

As explained above, according to the first embodiment of the present invention, the image processing apparatus is configured such that the second image data processing device performs a recognition process and a reflection process to transmit image data and auxiliary information to a network-connected client PC, and the client PC can determine whether to perform a recognition process and a reflection process based on the presence or absence of the recognition results. With this, recognition accuracy can be increased, the processing can be speeded up, and the configuration can be simplified.

An image processing apparatus according to a second embodiment of the present invention is such that whether to perform a reflection process is determined based on a certainty degree of a recognition process at the second image data processing device.

Figure 9:
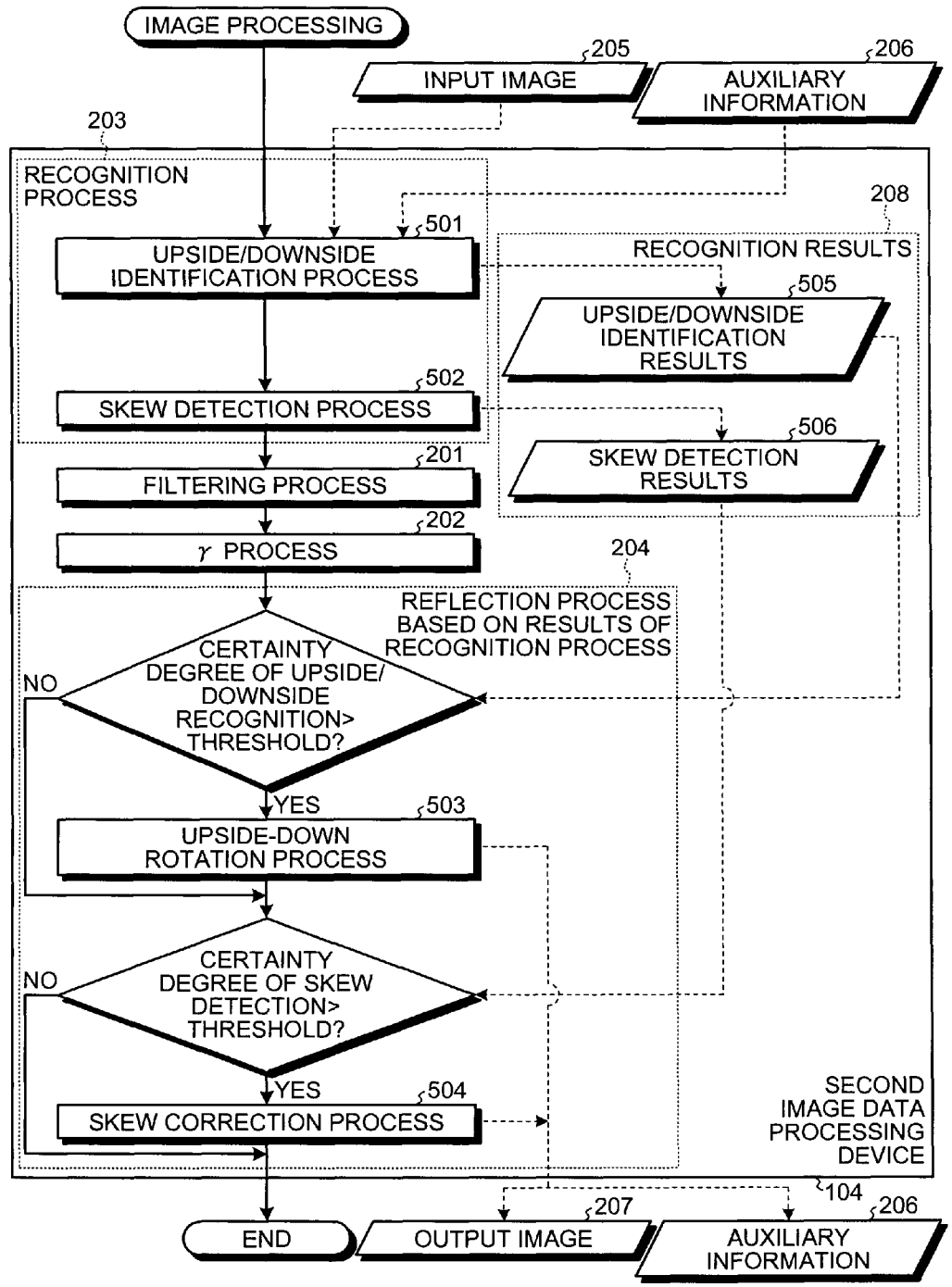
FIG. 9 is a flow diagram of a procedure of a second image data processing device according to a second embodiment of the present invention.

FIG. 9 is a flow diagram of a procedure in the second image data processing device of the image processing apparatus according to the second embodiment of the present invention. FIG. 10A is a drawing of an input/output example of an upside/downside identification process and an upside/downside correction process and FIG. 10B is a drawing of an input/output example of a skew detection process, and a skew correction process.

The function and operation of the image processing apparatus according to the second embodiment of the present invention configured as explained above are explained. With reference to FIG. 9, a copy operation when image data is input from the reading device 101 is explained. As the recognition process (step 203), the upside/downside identification process (step 501) and a skew detection process (step 502) are performed. In the upside/downside identification process (step 501), the direction of an image is recognized based on the amount of characteristics of the image. It is herein assumed that upward is called northward, with an image considered to be a map. Upside/downside identification results 505 include a direction of either one of eastward, westward, southward, and northward, and a certainty degree. FIG. 10A depicts an input/output example of an upside/downside identification process. In the upside/downside identification process, an input image oriented any one of eastward, westward, and southward is corrected so that images, characters, and graphics are oriented northward.

In the skew detection process (step 502), a tilt of the image is detected based on the characteristic amount of the image. Skew detection results 506 include a skew angle (±X degrees) and a skew determination result (certainty degree of detection of a skew angle). FIG. 10B depicts an example of an input/output example of a skew correction process. In the skew correction process, the input image input as being tilted by a certain angle is rotated to be an image without being tilted. The upside/downside identification process (step 501) and the skew detection process (step 502), which are the recognition process (step 203), are performed first by the second image data processing device 104 because recognition accuracy is changed by the influence of the filtering process (step 201) and the γ process (step 202), for example, and therefore a skew detection process is performed in a state where these processes have not yet been performed to increase the skew detection accuracy.

The upside/downside identification process (step 501) and the skew detection process (step 502), which are the recognition process (step 203), are performed, the upside/downside identification results 505 and the skew detection results 506, which are the recognition results 208, are output, and then the next filtering process (step 201) and the γ process (step 202) are performed. An upside-down rotation process (step 503) and the skew correction process (step 504), which are correction processes based on the recognition results, are performed on the image data being subjected to an optimal image process for the output device. The filtering process (step 201) and the γ process (step 202) are processes of changing a characteristic of the image, but do not influence position information. Therefore, the recognition results 208 obtained through detection in the state where the filtering process (step 201) or the γ process (step 202) has not been performed can be used for the image on which the filtering process (step 201) or the γ process (step 202) has been performed.

In the upside-down rotation process (step 503), the input image 205 is rotated by 90 degrees based on the upside/downside identification results 505. A threshold process is performed by using a certainty degree of the upside/downside identification results 505. If the certainty degree is equal to or greater than a certain threshold, it can be determined that a recognition process has surely been performed in the upside/downside identification process (step 501). Therefore, the input image 205 is rotated by units of 90 degrees based on the upside/downside identification results 505. If the certainty degree is equal to or less than the certain threshold, the recognition results cannot be ensured, and therefore correct results may not be obtained even if the recognition results are reflected. In that case, the upside-down rotation process (step 503) is not performed, and the procedure skips this process and outputs the input as it is.

In the skew correction process (step 504), the input image 205 is rotated by a subtle angle according to the skew detection results 506. A threshold process is performed by using a certainty degree of the skew detection results 506. If the certainty degree is equal to or greater than a certain threshold, it can be determined that a recognition process has surely been performed in the skew detection process (step 502). Therefore, the input image 205 is rotated by a subtle angle according to the skew detection results 506. If the certainty degree is equal to or less than the certain threshold, the recognition results cannot be ensured, and therefore correct results may not be obtained even if the recognition results are reflected. In that case, a skew correction process (step 504) is not performed, and the procedure skips this process and outputs the input as it is. In this manner, by using the certainty degree, whether to reflect the results of the upside/downside identification process (step 501) and the skew detection process (step 502) can be controlled.

As explained above, according to the second embodiment, whether to perform a reflection process in the image processing apparatus is determined based on the certainty degree of the recognition process in the second image data processing device. With this, the configuration can be simplified.

An image processing apparatus according to a third embodiment of the present invention is such that a recognition process and a reflection process are performed by an image processing controlling unit of software.

Figure 11:
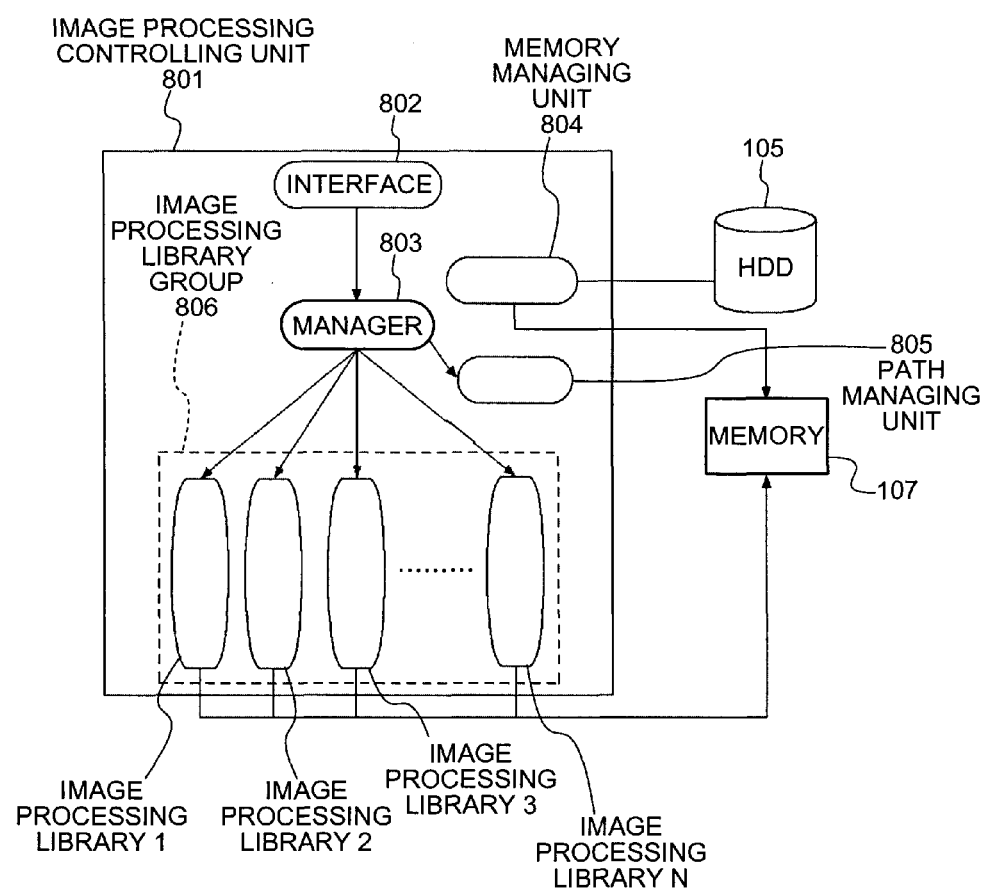
FIG. 11 is a schematic drawing of an image processing controlling unit of an image processing apparatus according to a third embodiment of the present invention.
Figure 12:
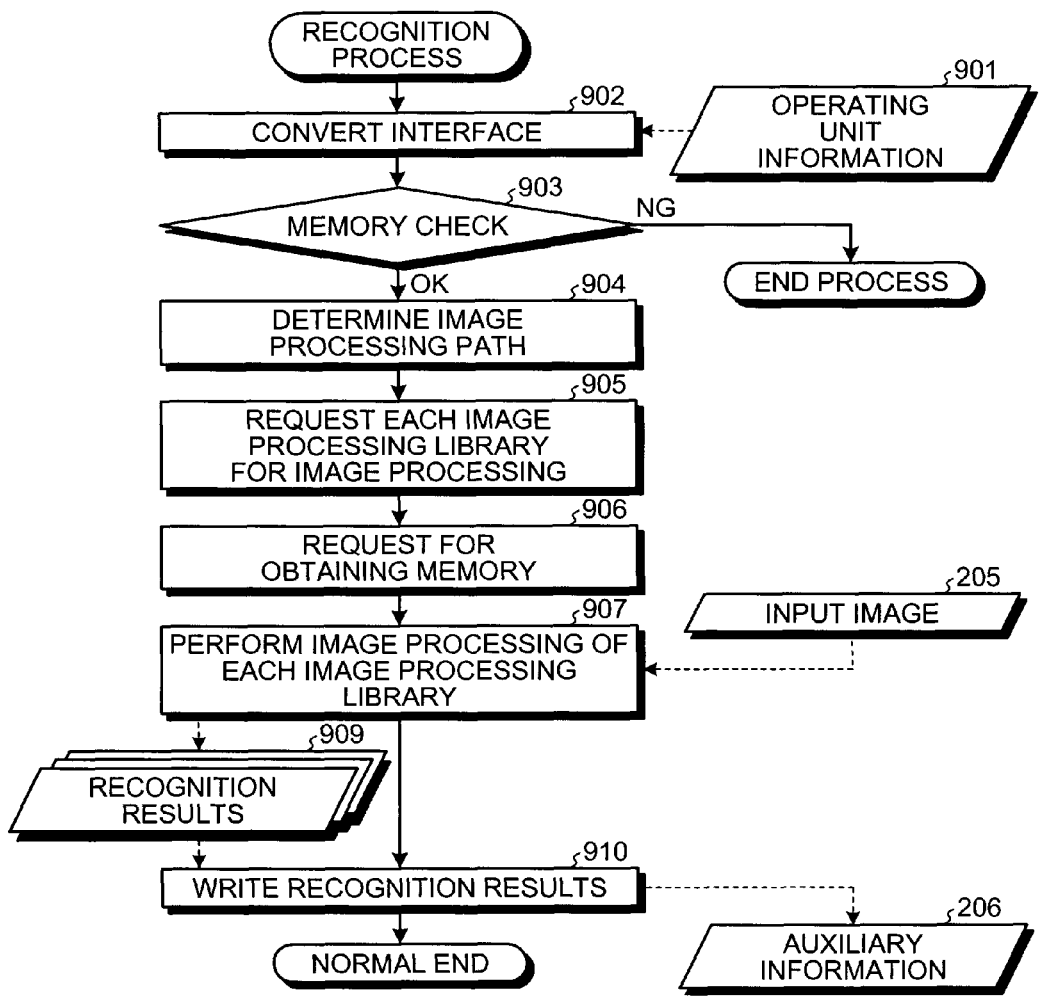
FIGS. 12 and 13 are flow diagrams of the image processing controlling unit of the image processing apparatus according to the third embodiment of the present invention.
Figure 13:
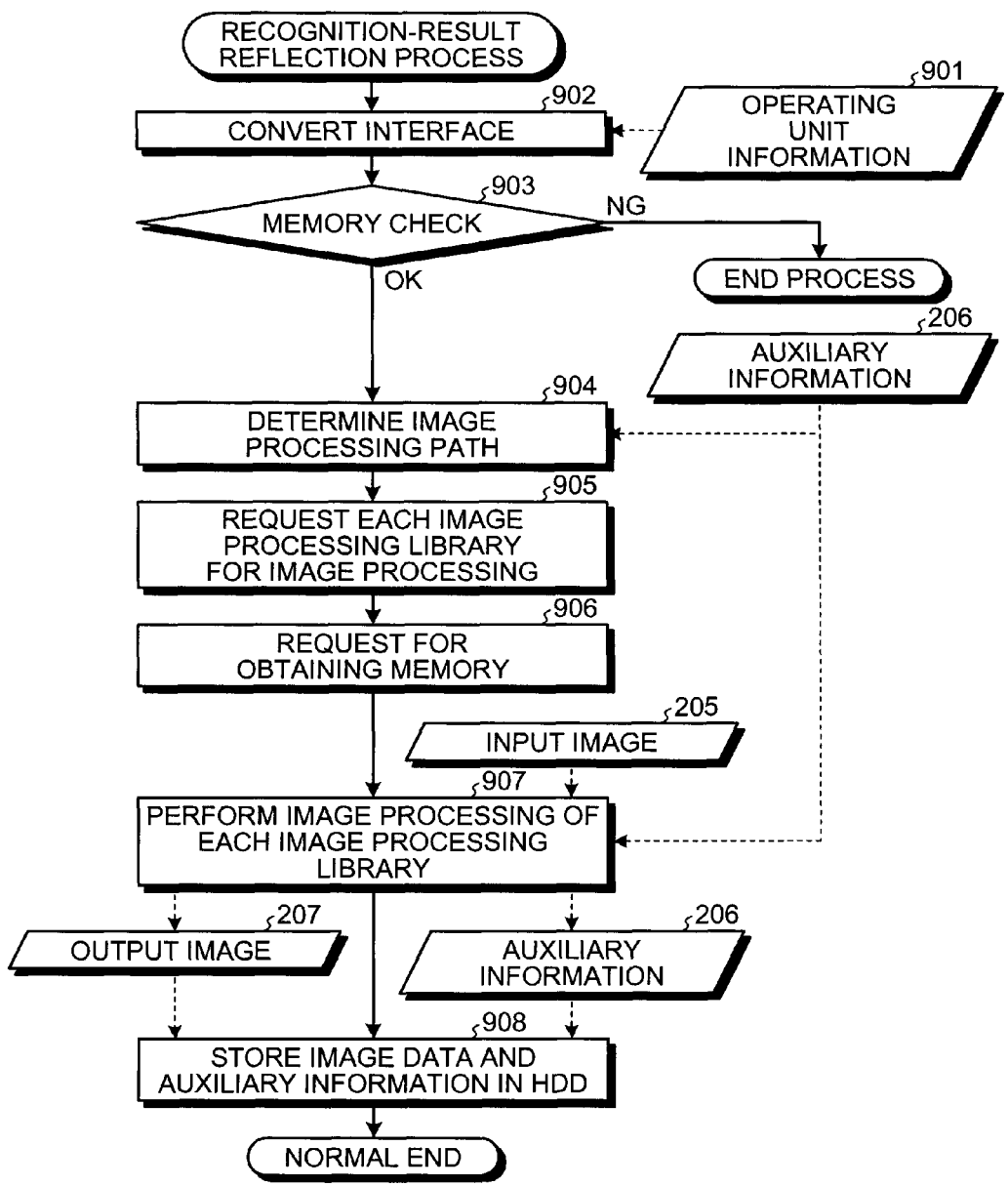
Figure 14:
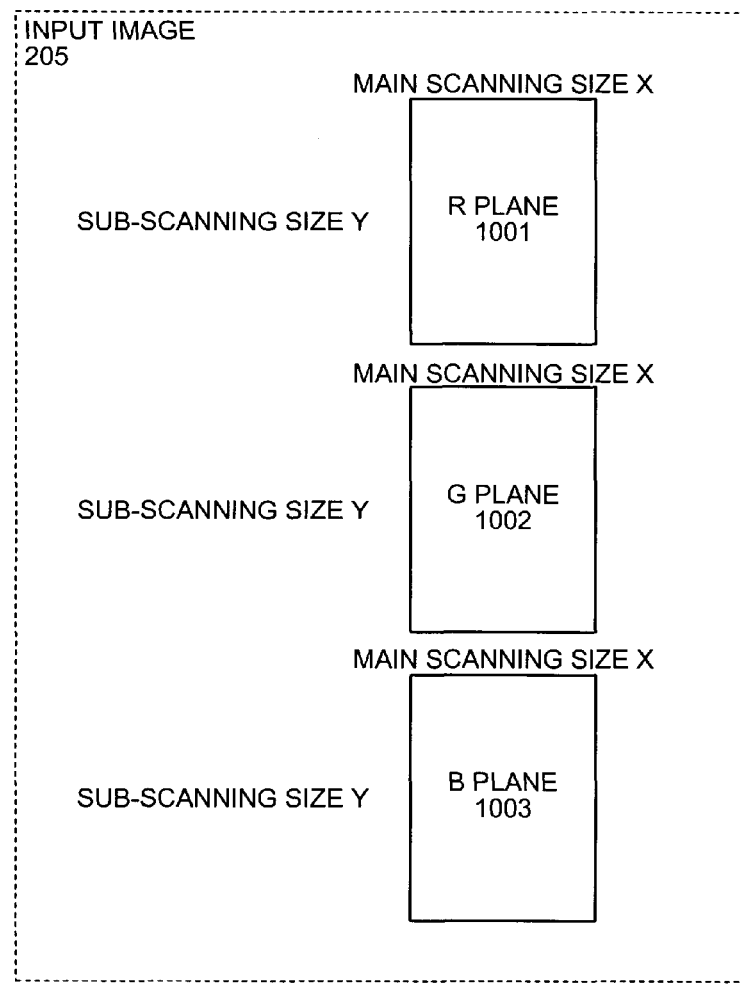
FIGS. 14 and 15 are examples of auxiliary information of the image processing apparatus according to the third embodiment of the present invention.
Figure 15:
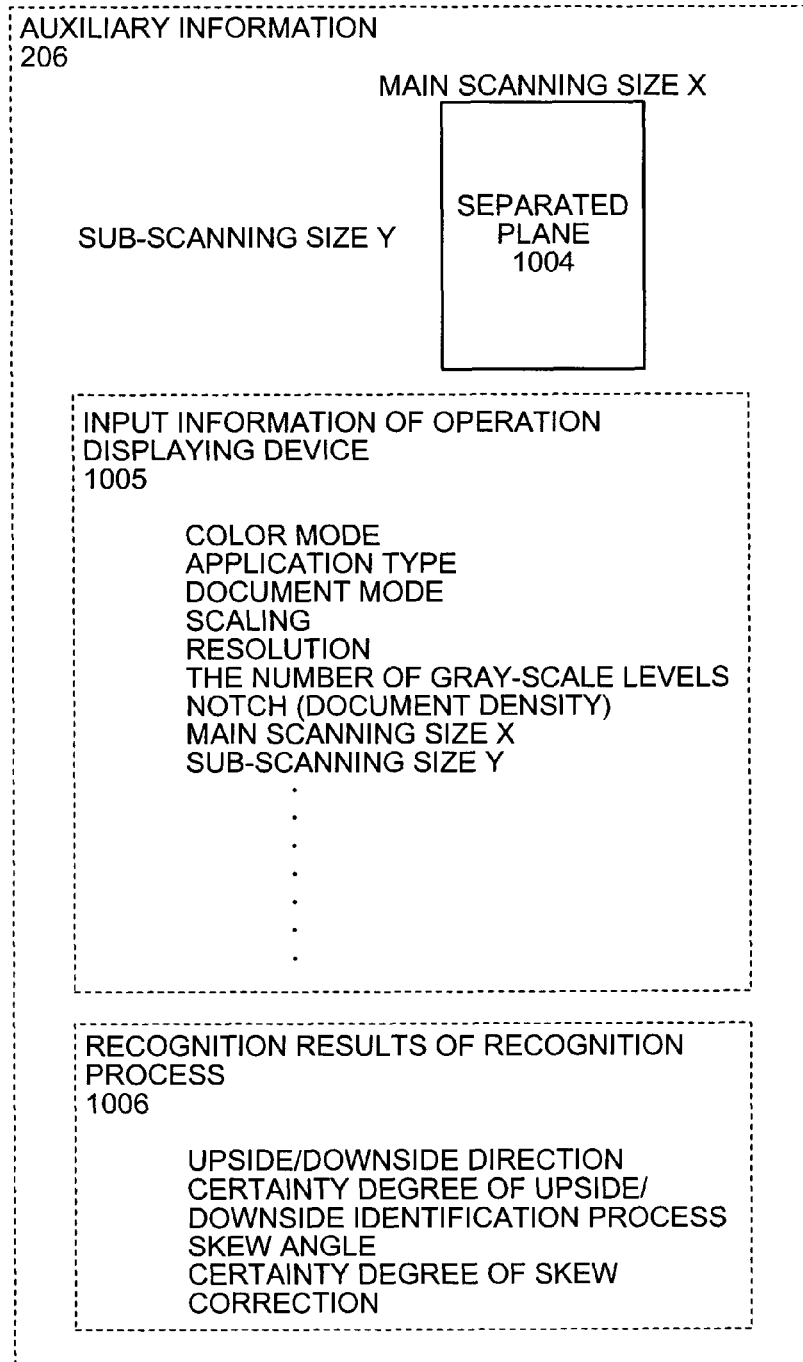

FIG. 11 is a schematic drawing of an image processing controlling unit for recognition process of the image processing apparatus according to the third embodiment of the present invention. FIGS. 12 and 13 are flow diagrams of the process of the image processing controlling unit. FIGS. 14 and 15 are examples of auxiliary information.

With reference to FIG. 11, the configuration of an image processing controlling unit 801 for recognition process and each process are explained. A unit that controls a recognition process inside the MFP device is software to be executed on the CPU 106. Since the filtering process (step 201) and the γ process (step 202) are image processes to be always performed, they are normally performed at an ASIC of a dedicated circuit. A register of the ASIC is processed by software. An interface 802 converts setting information specified by the operating unit (the operation displaying device 110 of FIG. 1). The format of the setting information varies in various models, and therefore a difference among models are solved for unification, and protocol conversion is performed so that the format is converted to the one suitable for an image processing library group 806. A manager 803 manages sequence of the entire image processing controlling unit 801. The manager 803 keeps track of the order in which the process is to be performed and which information is sent to where, and performs management so that the process is performed according to a predetermined sequence.

A memory managing unit 804 is present globally, which is referred to from the manager 803 and also from the image processing library group 806. The memory managing unit 804 determines whether a memory capacity required for processing has been implemented, and performs allocation and deallocation of memory required for image processing in the image processing library group 806. Also, the final process results are stored in the HDD 105. A path managing unit 805 manages an image processing order (path) of the implemented image processing library group 806. To achieve the function requested by the user, an image processing library for performing image processing is selected, and its processing order is determined.

The image processing library group 806 is image processing library for recognition process, and is present in functional units of the upside/downside identification process (step 501) and the skew correction process (step 504), for example. Other than that, an image process for the purpose of increasing a recognition ratio of the upside/downside identification process (step 501) and the skew correction process (step 504), and a binarizing process for determining a character area and others are also present. The image processing library for which execution of image processing is requested from the manager 803 requests memory required for image processing from the memory managing unit 804 for obtainment, and performs the recognition process (step 203) and the reflection process (step 204) on the input image.

With reference to FIGS. 12 and 13, a process sequence of the image processing controlling unit 801 is explained. The process sequence is broadly divided into the recognition process (step 203) and the reflection process (step 204). These processes are performed by one image processing controlling unit 801, and therefore two types of sequence are present as depicted in FIGS. 12 and 13, in which the procedure is almost the same. In the sequence of the recognition process of FIG. 12, operating unit information 901 specified by the user is subjected to interface conversion (step 902). Then, the interface-converted information is transferred to the manager 803 together with the input image 205 and the auxiliary information 206. Then, the memory managing unit 804 checks the memory (step 903), where the implemented memory capacity is checked to determine whether image processing can be performed by software. If the determination result indicates OK, the procedure continues. If it is determined that processing cannot be made, the procedure ends.

If it is determined that there is no problem with the memory capacity for performing image processing by software, the procedure goes to the next process, in which the manager 803 requests the path managing unit 805 to determine an image processing path (step 904). The path managing unit 805 then determines an image processing path based on the interface-converted operating unit information 901. For example, when an upside/downside identification process is requested by the user, binarization and upside/downside identification process (recognition) is selected as an image processing path. Next, according to the image processing path determined by the path managing unit 805, the manager 803 selects an image processing library group from among the image processing library group 806 for performing the process (step 905). First, for binarization, the input image 205 is used to perform a binarization process on a binarization library. To ensure an image area for a binarized image after binarization, a request for obtaining memory is issued to the memory managing unit 804 (step 906) to ensure an image area for the binarized image. After binarization, the manager 803 uses the binarized image to request a recognition process to an upside/downside identification process library. The upside/downside identification process library performs a determination process for upside/downside identification based on the binarized image sent from the manager 803 (step 907), thereby outputting a direction and a certainty degree, which are recognition results 909 of the upside/downside identification process. The manager 803 then writes the results output from the library in the auxiliary information 206 (step 910), and then ends the process.

A process of reflecting the recognition process depicted in FIG. 13 is approximately identical to that in FIG. 12, and therefore the same portions are not explained herein. A difference is that the auxiliary information 206 is used in determining the image processing path (step 904) by the path managing unit 805. In consideration of the certainty degree of the upside/downside identification process included in the auxiliary information 206, it is determined whether to add an upside/downside identification (rotation) process to the image processing path. If the certainty degree is equal to or greater than a certain threshold to determine that a rotation process is to be performed, an upside/downside identification process is added to the image processing path.

When the upside/downside identification process is added to the image processing path for image processing, in a performing process at the library (step 907), the upside/downside identification (rotation) process library uses the rotating direction result, which is a recognition result stored in the auxiliary information 206, to perform an image rotation process on the input image. Also for information corresponding to image position information, such as separated data in the auxiliary information 206, if positional conversion, such as a rotation process, is performed, the position will not be matched, and therefore an upside/downside identification (rotation) process is performed similarly. When a request from the operating unit information 901 specifies an HDD accumulation application for the output image 207 and the auxiliary information 206, which are image processing results, the results after image processing are stored in the HDD 105. From the manager 803 to the memory managing unit 804, an HDD writing request is issued, and then the memory managing unit 804 stores the image data and the auxiliary information in the HDD (step 908) to write the output image 207 and the auxiliary information 206 in the HDD 105, thereby ending the process.

Examples of the auxiliary information 206 are depicted in FIGS. 14 and 15, in which components forming the input image 205, which is an input of the second image data processing device 104, and the auxiliary information 206 are depicted. They serve as input information in the upside/downside identification process (step 501) and the skew detection process (step 502), which are the recognition process (step 203). At the time of color selection, a color image of RGB, which is a unified color space, is input to the second image data processing device 104 as the input image 205. Image of three planes, that is, an R plane 1001, a G plane 1002, and a B plane 1003, are input in a one-dimensional matrix of an amount of (main scanning size X)×(sub-scanning size Y).

The auxiliary information 206 is broadly divided into a separated plane 1004, input information 1005 from the operation displaying device 110, and recognition results 1006 of the recognition process (step 203). The information about the separated plane 1004 corresponds to N bits of the separation information for each pixel of the image, and is represented as a one-dimensional matrix of the amount of (main scanning size X×sub-scanning size Y). This separated plane 1004 indicates information generated by the first image data processing device 102 based on the characteristics of the input image.

The input information 1005 from the operation displaying device 110 is information set by the user. In the example of FIG. 15, the information includes color mode, application type, document mode, scaling, resolution, number of gray-scale levels, notch (document density), main scanning size X, and sub-scanning size Y.

The recognition results 1006 of the recognition process (step 203) include an upside/downside direction, a skew angle, and skew detection results, which are detection results recognized in the recognition process (step 203) by the second image data processing device 104. When the user does not select a recognition process, an image direction specified by the user is set as the upside/downside direction in the recognition results 1006, a skew correction angle is 0 degree, and information indicating that no skew correction is performed is stored as the skew detection results. With reference to the recognition results 1006, based on the upside/downside certainty degree and the skew detection certainty degree, it is selected whether to perform the recognition process (the upside/downside identification process (step 501) and the skew detection process (step 502)) and the reflection process (the upside-down rotation process (step 503) and the skew correction process (step 504)).

As explained above, in the third embodiment of the present invention, the software image processing controlling unit of the image processing apparatus performs a recognition process and a reflection process. With this, the configuration can be simplified.

An image processing apparatus according to a fourth embodiment of the present invention is such that an image processing controlling unit controls a DSP and an ASIC to perform a recognition process and a reflection process.

Figure 16:
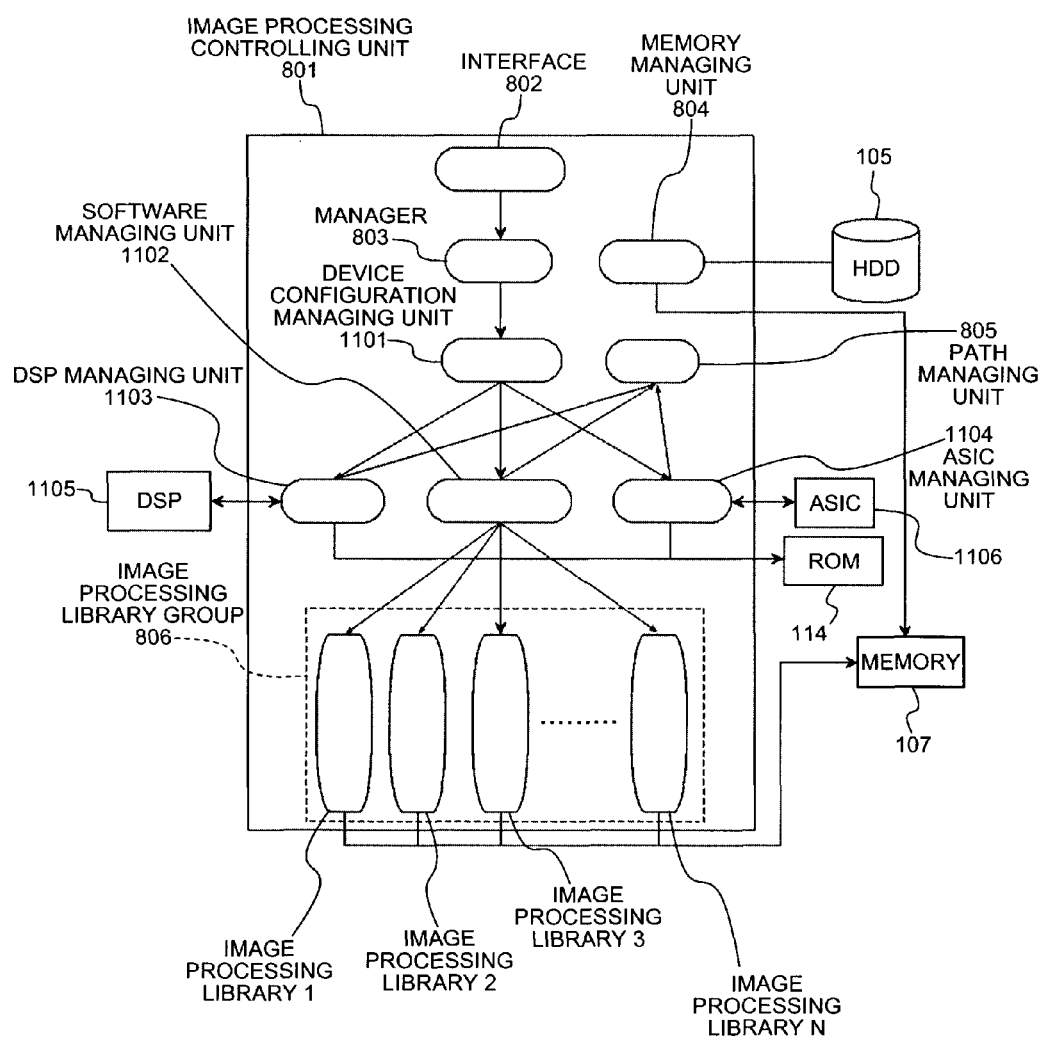
FIG. 16 is a schematic drawing of an image processing controlling unit of an image processing apparatus according to a fourth embodiment of the present invention.
Figure 17:
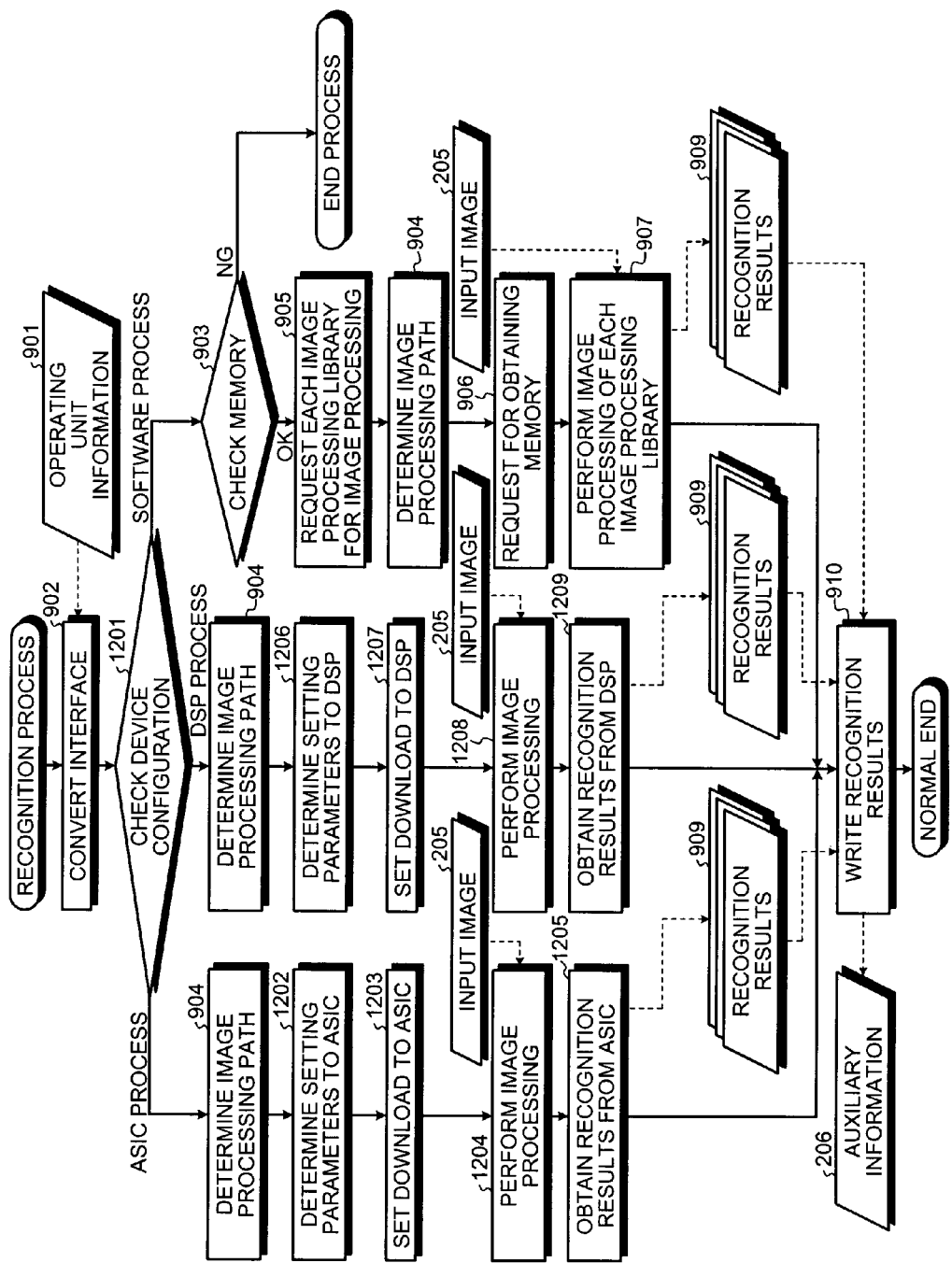
FIGS. 17 and 18 are flow diagrams of the image processing controlling unit of the image processing apparatus according to the fourth embodiment of the present invention.
Figure 18:
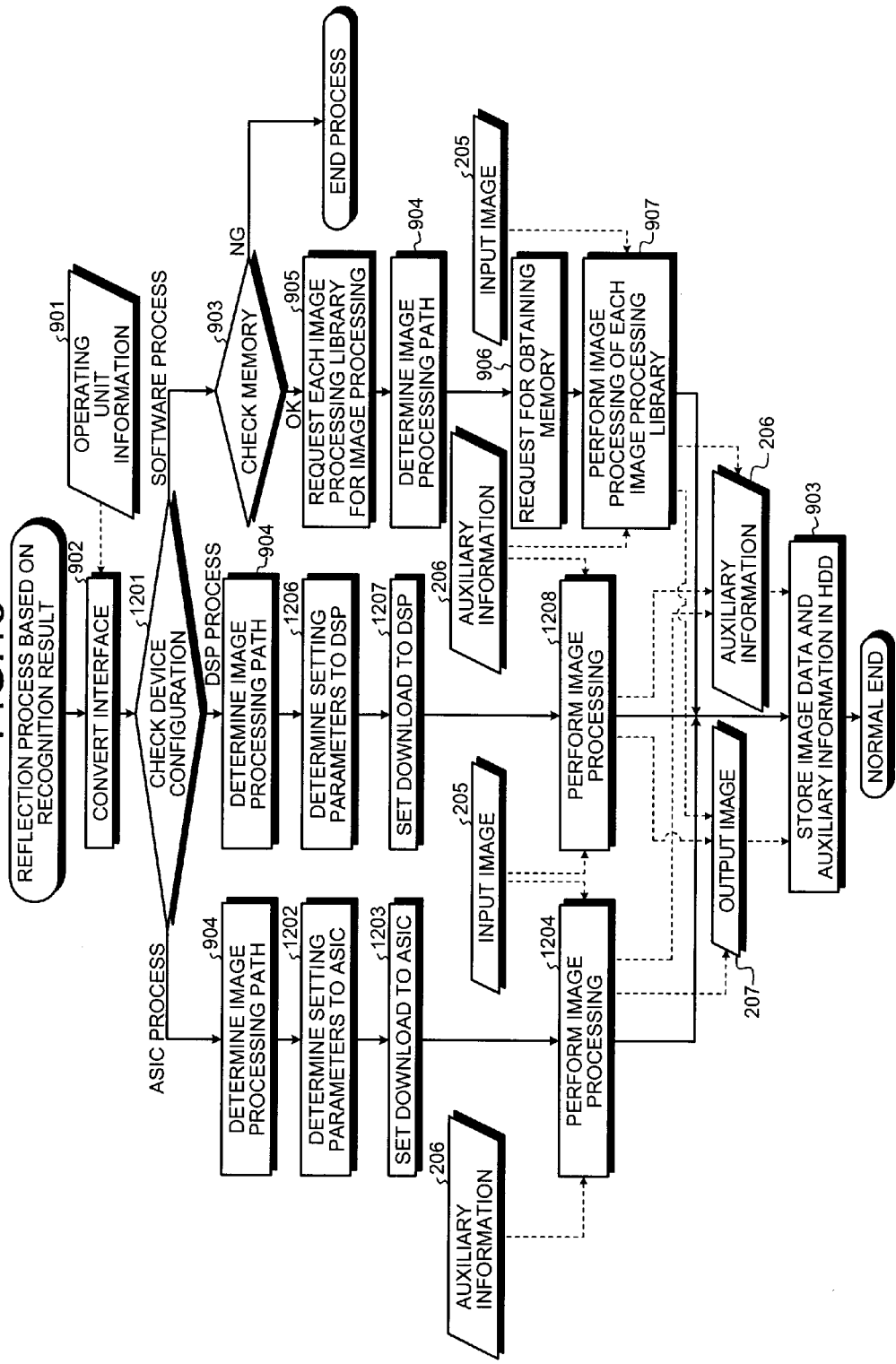

FIG. 16 is a schematic drawing of an image processing controlling unit of the image processing apparatus according to the fourth embodiment of the present invention. FIGS. 17 and 18 are flow diagrams of the image processing controlling unit. FIGS. 19 and 20 are a reference example of register setting values to be downloaded to an ASIC and a reference example of an image processing program to be downloaded to a DSP.

Units that control the recognition process inside the MFP device are the CPU 106 and the software. With the image processing controlling unit 801 causing a DSP 1105 and an ASIC 1106 to perform processing, the speed of the processing can be increased compared with the case of the software image processing. FIG. 16 depicts the configuration of the image processing controlling unit 801 that controls the DSP 1105 and the ASIC 1106 for recognition process. To the configuration according to the third embodiment, a device configuration managing unit 1101, a software managing unit 1102, a DSP managing unit 1103, and an ASIC managing unit 1104 are added. The DSP 1105 and the ASIC 1106, which are control targets of the image processing controlling unit 801, are not included in the image processing controlling unit 801. Components of the image processing controlling unit 801 in FIG. 16 are now explained. Since the interface 802, the manager 803, the memory managing unit 804, the path managing unit 805, and the image processing library group 806 are identical to those in FIG. 11, they are not explained herein.

The device configuration managing unit 1101 checks the DSP 1105 and ASIC 1106 for image processing implemented in a controller unit and, upon receiving an image processing request from the manager 803, selects a unit capable of achieving an optimal image process according to the information about the components of the MFP device to request the execution of image processing.

The software managing unit 1102 manages a sequence for image processing with software. The software managing unit 1102 inquires the memory managing unit 804 about a memory capacity required for image processing, and causes the path managing unit 805 to determine an image processing path. According to the determined image processing path, image processing is requested to the image processing library group 806. The image processing results are then reported to the device configuration managing unit 1101 and the manager 803.

The DSP managing unit 1103 manages an access to the DSP 1105 and a sequence for image processing with middleware. The DSP managing unit 1103 causes the path managing unit 805 to determine an image processing path. According to the determined image processing path, an image processing program required for causing the DSP 1105 to perform image processing is read from the ROM 114 to be downloaded to the DSP 1105. After the determination of the image processing program and preparation for performing image processing, image processing is requested. The image processing results are reported to the device configuration managing unit 1101 and the manager 803.

The ASIC managing unit 1104 manages an access to the ASIC 1106 and a sequence for image processing with hardware. The ASIC managing unit 1104 causes the path managing unit 805 to determine an image processing path. According to the determined image processing path, an image processing parameters required for causing the ASIC 1106 to perform image processing are read from the ROM 114 to be set in a register of the ASIC 1106. After setting of the image processing parameters and preparation for performing image processing, image processing is requested. The image processing results are reported to the device configuration managing unit 1101 and the manager 803.

FIGS. 17 and 18 depict flows of the process of the image processing controlling unit 801 that controls the DSP 1105 and the ASIC 1106 for recognition process. Since three units for achieving image processing are present in the recognition process and the process of reflecting the recognition process, three process flows are present. An image processing unit by software is approximately identical to that in FIGS. 12 and 13, and therefore is not explained herein. By way of example, a process flow is explained when a recognition process is performed by the DSP 1105 and the process of reflecting the recognition process is performed by the ASIC 1106. Since the recognition process (step 203) and the reflection process (step 203) are controlled by the single image processing controlling unit 801, the sequence can be broadly divided into two types depicted in FIGS. 17 and 18. FIGS. 17 and 18, and these procedures are almost the same.

In the sequence of the recognition process of FIG. 17, the operating unit information 901 specified by the user is subjected to interface conversion (step 902). Then, the interface-converted information is transferred to the manager 803 together with the input image 205 and the auxiliary information 206, and the device configuration managing unit 1101 is requested to check the MFP device configuration (step 1201). The device configuration managing unit 1101 then inquires the second image data processing device 104 about an implementation state of the DSP 1105 and the ASIC 1106 implemented on the MFP device for image processing, and knows the implementation state. When the model has implemented thereon the DSP 1105, an image processing request is sent to the DSP managing unit 1103. Upon receiving the image processing request, the DSP managing unit 1103 first requests the path managing unit 805 to determine an image processing path (step 904) for the purpose of determining an image processing path for performing image processing at the DSP 1105.

The path managing unit 805 then determines an image processing path executable in the DSP 1105. After the determination of the image processing path, preparation of the DSP 1105 is performed to perform image processing present in that path. In setting parameter determination to the DSP (step 1206), an image processing program required for performing image processing at the DSP is determined. In download setting to the DSP (step 1207), the image processing program stored in the ROM 114 is downloaded to the DSP 1105. By way of example, when a filtering process is present in the image processing path, an image processing program required for performing a filtering process is selected, and contents of image processing of the filtering process to be performed inside the DSP 1105 are determined. After downloads to the DSP 1105 have been performed for all image processes that are present in the image processing path, the input image 205 is used to perform image processing at the DSP 1105 (step 1208). After performing the image processing, the recognition results are obtained from the DSP (step 1209), and then the recognition results of the DSP 1105 are read. The read results are reported to the manager from the DSP managing unit 1103 via the device configuration managing unit 1101. The manager 803 writes the results in the auxiliary information 206 (step 910), thereby ending the process. A similar procedure is applied for the ASIC process. In the case of software process, the procedure is similar to that already explained above.

In the sequence of the process of reflecting the recognition process in FIG. 18, the operating unit information 901 specified by the user is subjected to interface conversion (step 902). Then, the interface-converted information is transferred to the manager 803 together with the input image 205 and the auxiliary information 206. Then, the device configuration managing unit 1101 is requested to check the device configuration (step 1201). The device configuration managing unit 1101 inquires the second image data processing device 104 about an implementation state of the DSP 1105 and the ASIC 1106 implemented on the MFP device for image processing, and knows the implementation state. When the model has implemented thereon the ASIC 1106, an image processing request is sent to the ASIC managing unit 1104. Upon receiving the image processing request, the ASIC managing unit 1104 first requests the path managing unit 805 to determine an image processing path (step 904) for the purpose of determining an image processing path for performing image processing at the ASIC.

The path managing unit 805 has previously retained therein a state of a dedicated circuit for image processing implemented on the ASIC 1106, and determines an image processing path from the contents. After the determination of the image processing path, preparation of the ASIC 1106 is performed to perform image processing present in that path (step 1202). In download setting to the ASIC (step 1203), the image processing parameters stored in the ROM 114 are set in a specific register of the ASIC 1106. By way of example, when an upside/downside identification (rotation) process is to be achieved, an angle of upside-down rotation is set in the register of the ASIC 1106. The dedicated image processing circuit implemented in the ASIC 1106 performs a rotation process by using this upside-down rotation angle as a parameter. After downloads to the ASIC 1106 have been performed for all image processes that are present in the image processing path, the rotation direction result, which is a recognition result stored in the auxiliary information 206, is used in the image processing execution (step 1204) to perform an image rotation process on the input image in the upside/downside identification (rotation) process. After performing the image processing, the recognition results are obtained from the ASIC 1106 (step 1205), and then the recognition results of the ASIC 1106 are read.

Also for information corresponding to image position information, such as separated data in the auxiliary information 206, if positional conversion, such as a rotation process, is performed, the position will not be matched, and therefore an upside/downside identification (rotation) process is performed similarly. When a request from the operating unit information 901 specifies an HDD accumulation application for the output image 207 and the auxiliary information 206, which are image processing results, the results after image processing are stored in the HDD 105. From the manager 803 to the memory managing unit 804, an HDD writing request is issued, and then the memory managing unit 804 stores the output image 207 and the auxiliary information 206 in the HDD 105 (step 908), thereby ending the process. A similar procedure is applied for the DSP process. In the case of software process, the procedure is similar to that already explained above.

A reference example of the register setting values to be downloaded to the ASIC 1106 by the ASIC managing unit 1104 are depicted in FIG. 19. Image processing parameters are set to an ASIC register group by using a table of a const area according to the contents assigned to each bit. Basically, one register corresponds to one word (16 bits). Since one register is in a unit of one word, two table components of FilC_Tbl of sixteen bits are written as upper eight bits and lower eight bits. As a specific example, a schematic example of parameters actually set is depicted. Parameters set to the ASIC are numerical values in units of eight bits or sixteen bits of a table component, and are all stored in the ROM 114 of FIG. 1. Registers for a filtering process are configured of a register A (upper eight bits: vertical matrix size, lower eight bits: horizontal matrix size), a register B (sixteen-bit filter matrix strength), and registers C to Z (each register is a sixteen-bit filter matrix).

A reference example of the image processing program to be downloaded to the DSP 1105 by the DSP managing unit 1103 is depicted in FIG. 20. Parameters set in the DSP are basically identical to those of ASIC, but the difference is that the image processing program itself is to be handled. Examples of the parameters set in the DSP include a program and data. The program is actually downloaded to the DSP and image processing is performed based on that program, and is represented by hexadecimal numbers managed by matrix. One unit of the program is two words, which is set as upper sixteen bits and lower sixteen bits. The data serves as values referred to by the program downloaded to the DSP for image processing, and examples include data for a threshold process and γ data. Both of the program and data are represented by numbers of table components or matrix components (const area). A unit of writing is eight bits or sixteen bits. The data and programs are all stored in the ROM 114 of FIG. 1. The programs and data for the filtering process include a program A (for main scanning), a program B (for sub-scanning) and data A (strength).

As explained above, in the fourth embodiment of the present invention, the image processing controlling unit of the image processing apparatus controls the DSP and the ASIC to perform a recognition process and a reflection process. With this, the configuration can be simplified.

An image processing apparatus according to a fifth embodiment of the present invention is such that the memory capacity is checked only at the time of power-on to find a maximum processable image data size and, when image processing cannot be performed due to shortage of memory capacity, an indication is displayed as such and the user is prompted to change the settings.

Figure 21:
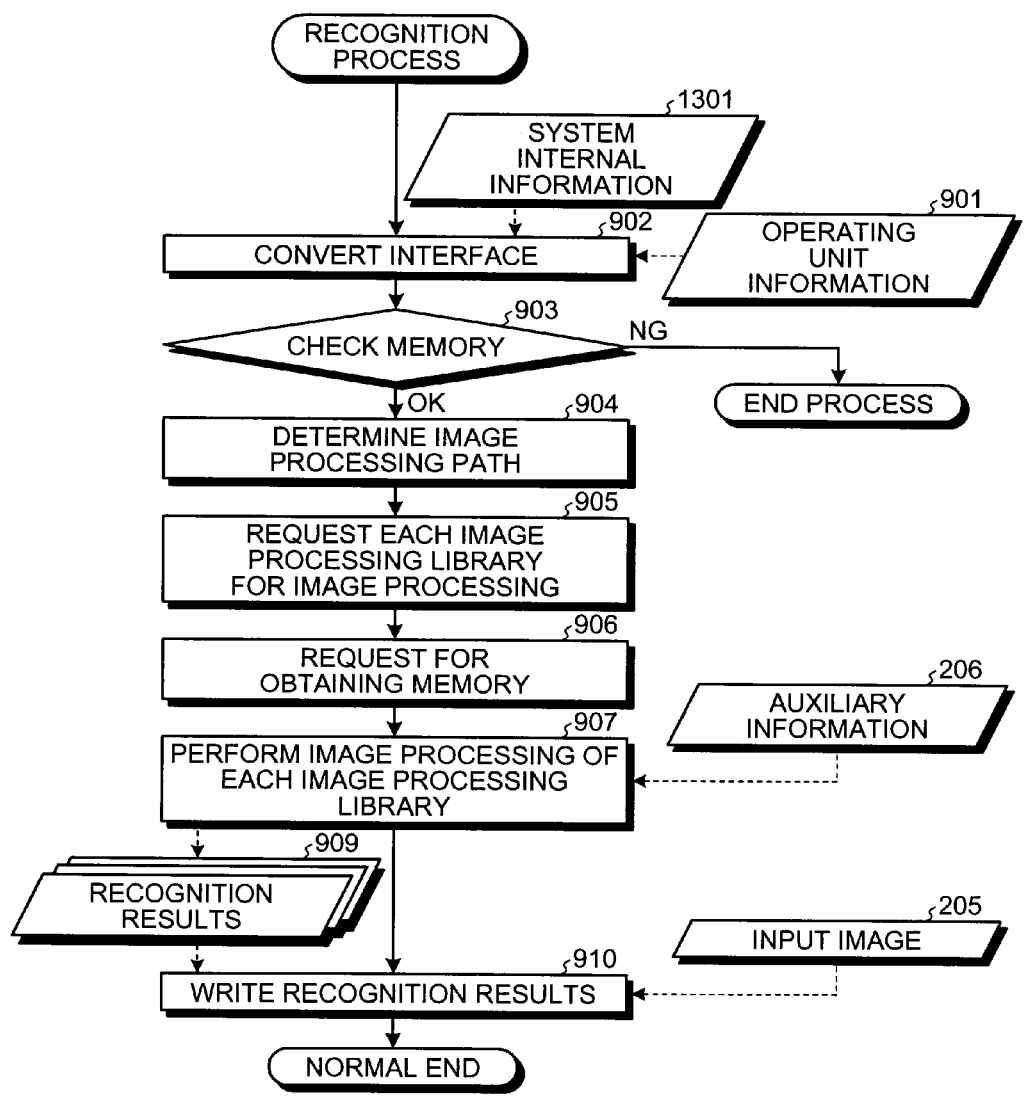
FIGS. 21 and 22 are flow diagrams of procedures of an image processing controlling unit of an image processing apparatus according to a fifth embodiment of the present invention.
Figure 22:
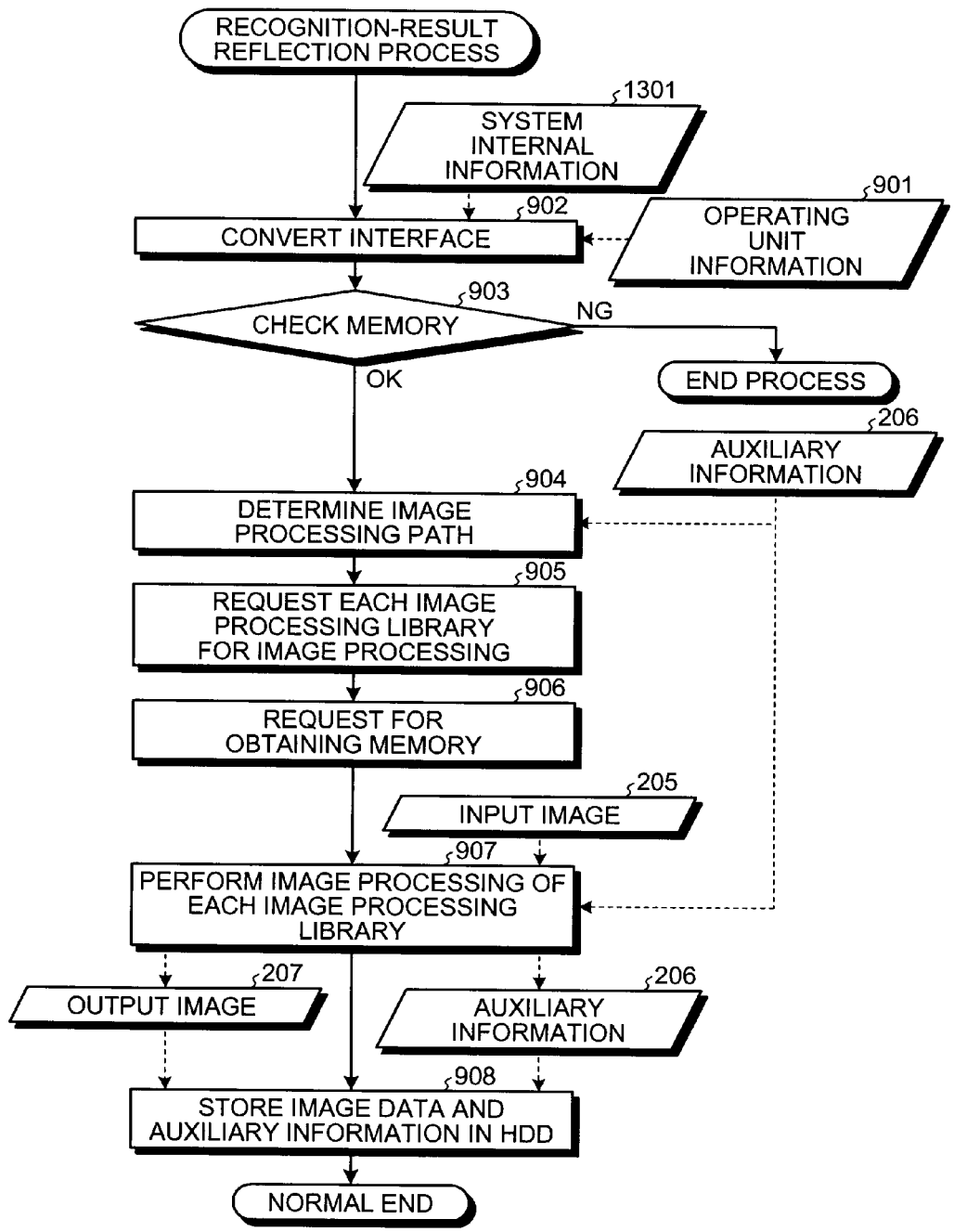
Figure 23:
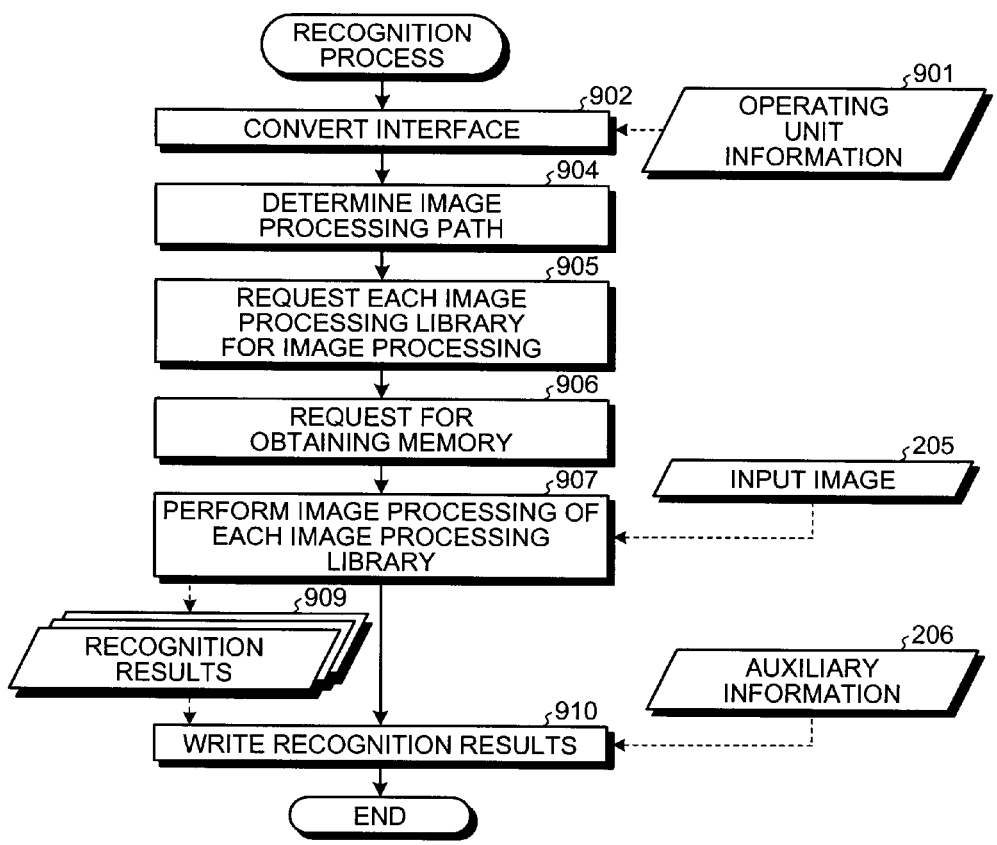
FIGS. 23 to 25 are flow diagrams of procedures in which a determination at a memory managing unit of the image processing apparatus according to the fifth embodiment of the present invention is performed only at the time of power-on and FIG. 26 is a drawing of an example of display of prompting for a change in setting at the time of shortage of memory capacity.
Figure 24:
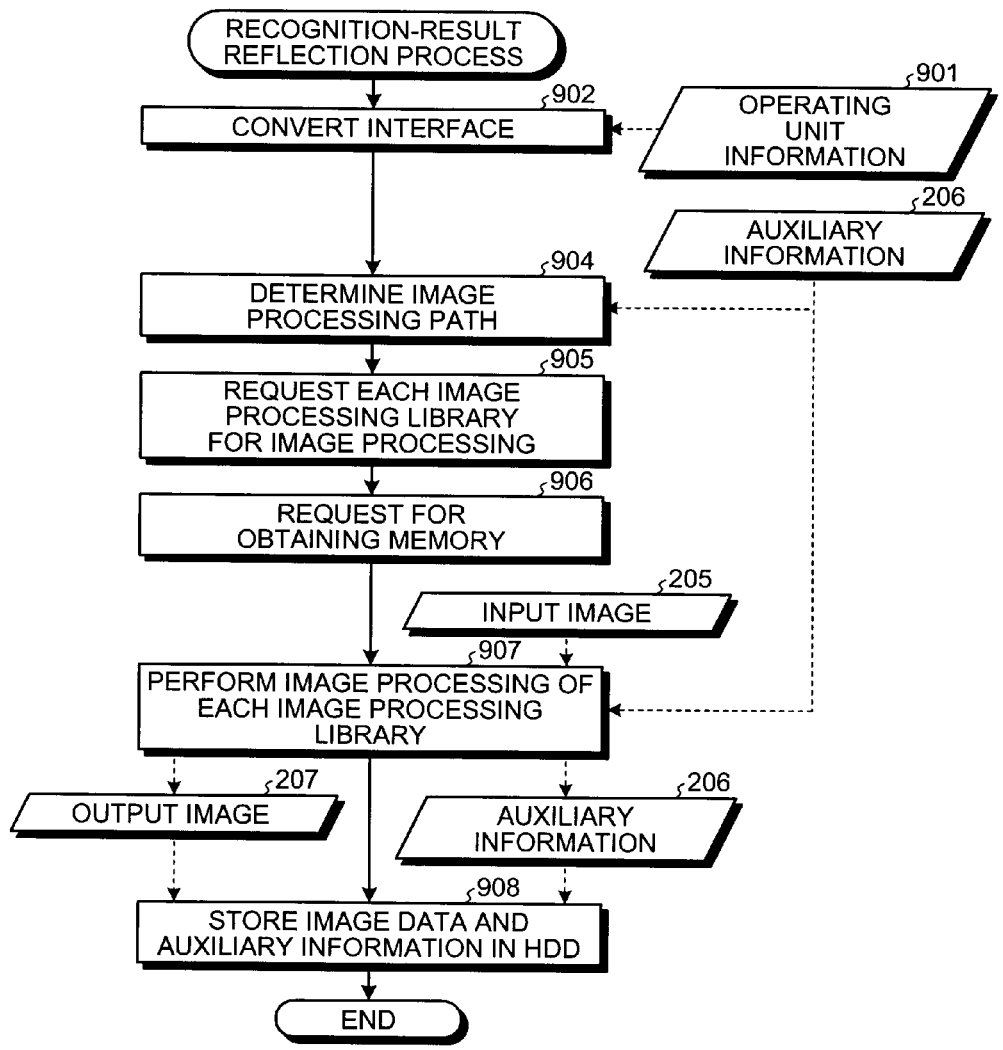
Figure 25:
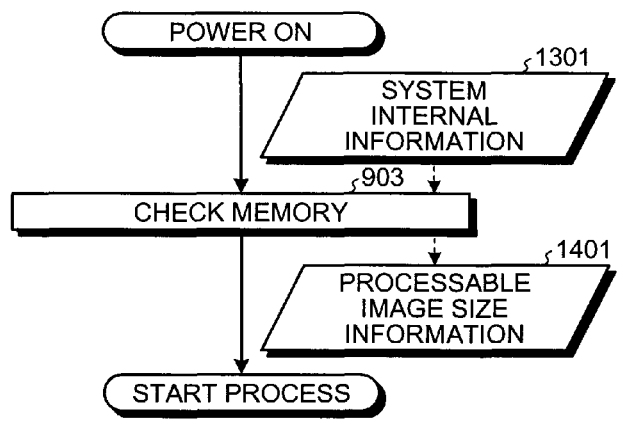
Figure 26:
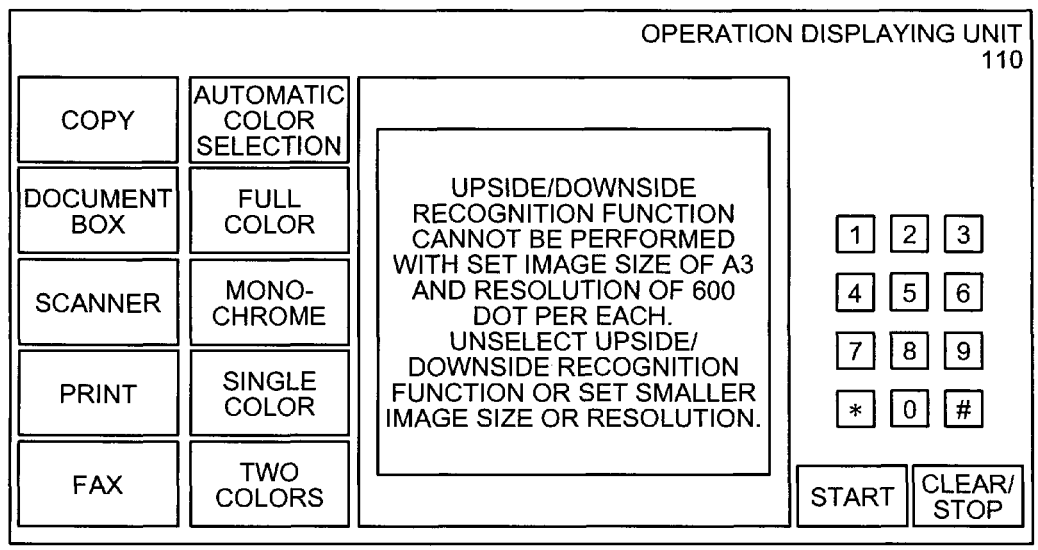

FIGS. 21 and 22 are flow diagrams of procedures of an image processing controlling unit of the image processing apparatus according to the fifth embodiment of the present invention. FIGS. 23 to 25 are flow diagrams of procedures in which a determination at a memory managing unit is performed only at the time of power-on and FIG. 26 is a drawing of an example of display of prompting for a change in setting at the time of shortage of memory capacity.

With reference to FIGS. 21 and 22, a method of checking the memory capacity by the image processing controlling unit is explained. The memory managing unit 804 knows the total memory capacity of the implemented memory 107. For the memory use amount for use in image processing by software, which is a comparison target, an image size (a total number of pixels) is used. The memory managing unit, which is part of the image processing controlling unit 801 executed by the CPU 106, checks the memory capacity. Since the CPU 106 and the memory 107 are directly connected via a signal line, the CPU 106 can check the capacity of the connected memory.

System internal information is input as fourth information to the image processing controlling unit 801 together with the input image 205, the auxiliary information 206, and the operating unit information 901. The entire process flow is approximately identical to that explained in FIGS. 12 and 13. After protocol conversion by the interface 802, if that information is transferred to the memory managing unit 804 via the manager 803, the memory capacity usable by the MFP device can be known, and therefore it is possible to determine whether image processing by software can be performed. The same applies to the process flows of the image processing controlling unit 801 depicted in FIGS. 17 and 18. In the process flows depicted in FIGS. 12 and 13, the memory managing unit 804 performs a determination process every time a copy, scanner, fax, accumulation application is set once to determine whether the process can be performed.

With reference to FIGS. 23 to 26, a method of performing a determination by the memory managing unit only at the time of power-on is explained. A determination of the capacity of the memory 107 incorporated in the MFP device is performed only once at the time of power-on. With this, this process can be prevented from being included in a normal process flow. Thus, the process time required for this process can be omitted, thereby increasing the process speed. As depicted in FIG. 25, the memory managing unit 804 checks the memory (step 903) once at the time of power-on so as to check a maximum process size allowing image processing. Upon returning the results indicating processable image size information 1401, if the image size specified by the user is out of a processable range, the processes depicted in FIGS. 23 and 24 are not performed for termination. In the processes depicted in FIG. 25, the results indicating the maximum memory size required for image processing are output as the processable image size information 1401. If image processing by software is not processable due to other factors, such information is also output.

Also, when power is turned off to mount or dismount the memory 107 to cause a change in the total memory capacity, the total memory capacity is checked at least once to allow a determination of whether image processing can be performed. The process of the image processing controlling unit 801 depicted in FIGS. 17 and 18 can also be performed similarly.

By outputting the processable image size of the image processing library group 806 implemented in the image processing controlling unit 801, a controlling unit that manages the operation displaying unit 110 can know the maximum image size. With this, as depicted in FIG. 26, when the user specifies a maximum resolution and image size at the operation displaying device 110 and then further tries to select a recognition process, it can be determined that image processing cannot be performed with the memory capacity incorporated in the MFP device. Therefore, a warning is issued indicating that the resolution or the image size should be decreased or a determination of not performing the function should be made, thereby requesting the user for resetting. With this, it is possible to avoid a situation where an output is produced without performing the process due to shortage of memory capacity for image processing on the MFP device side even though the user has specified the function.

As explained above, in the fifth embodiment of the present invention, the image processing apparatus is configured such that the memory capacity is checked only at the time of power-on to find a maximum processable image data size and, if image processing cannot be performed due to shortage of memory capacity, an indication is displayed as such and the user is prompted to change the settings. With this, the process time can be shortened, and it is possible to avoid a situation where an output is produced without performing the specified process.

An image processing apparatus according to a sixth embodiment of the present invention is such that a recognition process and a reflection process are performed by a third image data processing device.

Figure 27:
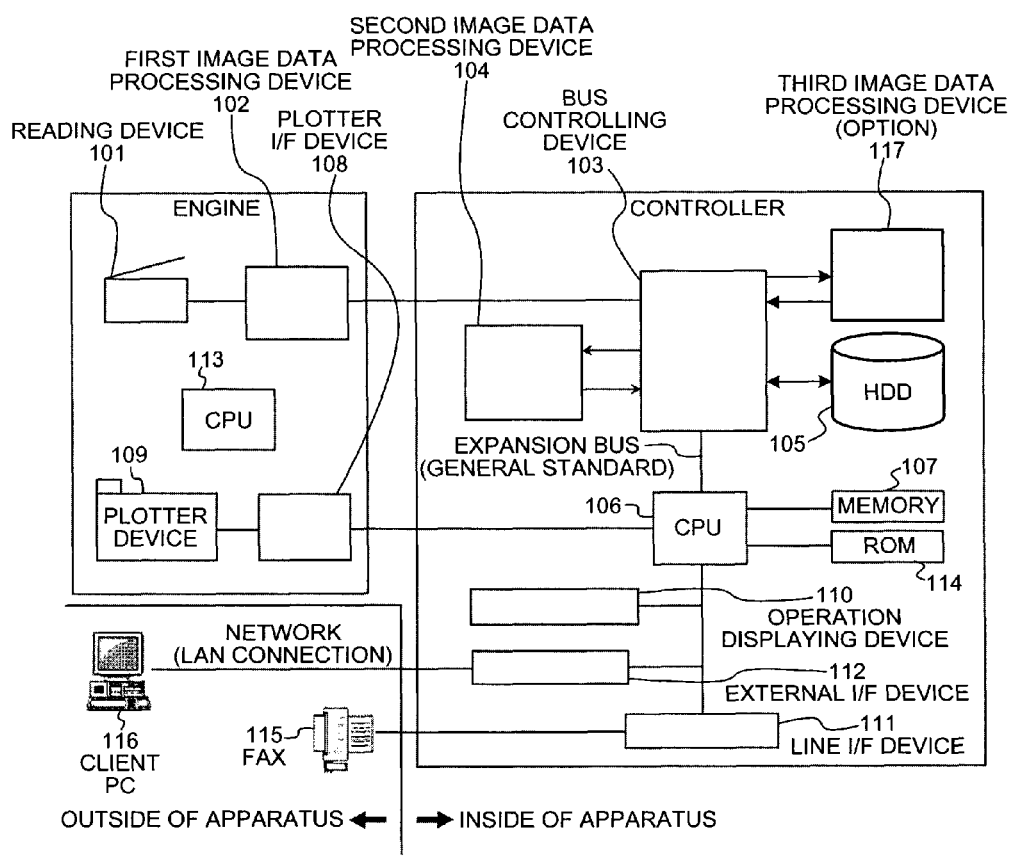
FIG. 27 is a drawing of the configuration including options of an image processing apparatus according to a sixth embodiment of the present invention and, FIGS. 28 and 29 are conceptual diagrams of the configuration of second and third image data processing devices.
Figure 28:
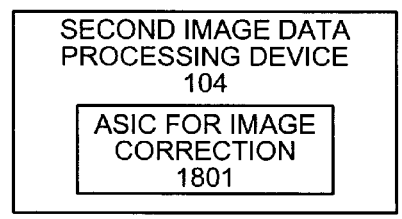
Figure 29:
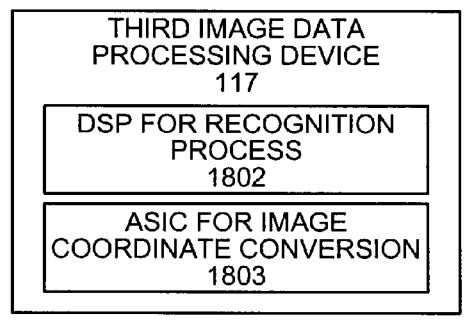
Figure 30:
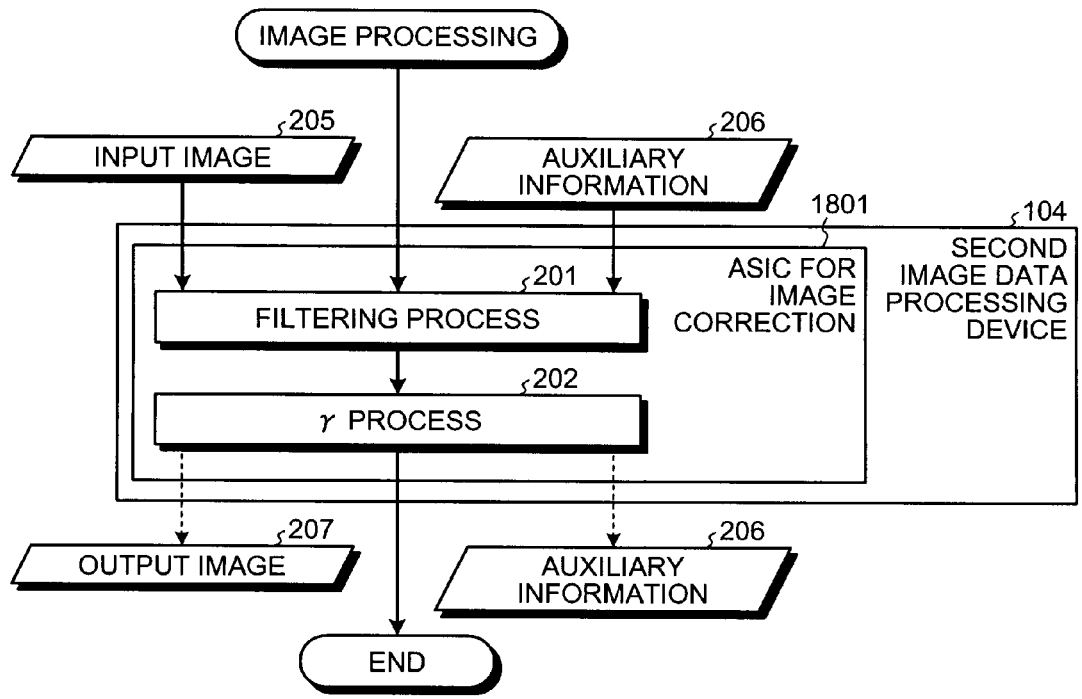
FIGS. 30 to 32 are flow diagrams of procedures of the second and third image data processing devices of the image processing apparatus according to the sixth embodiment of the present invention.
Figure 31:
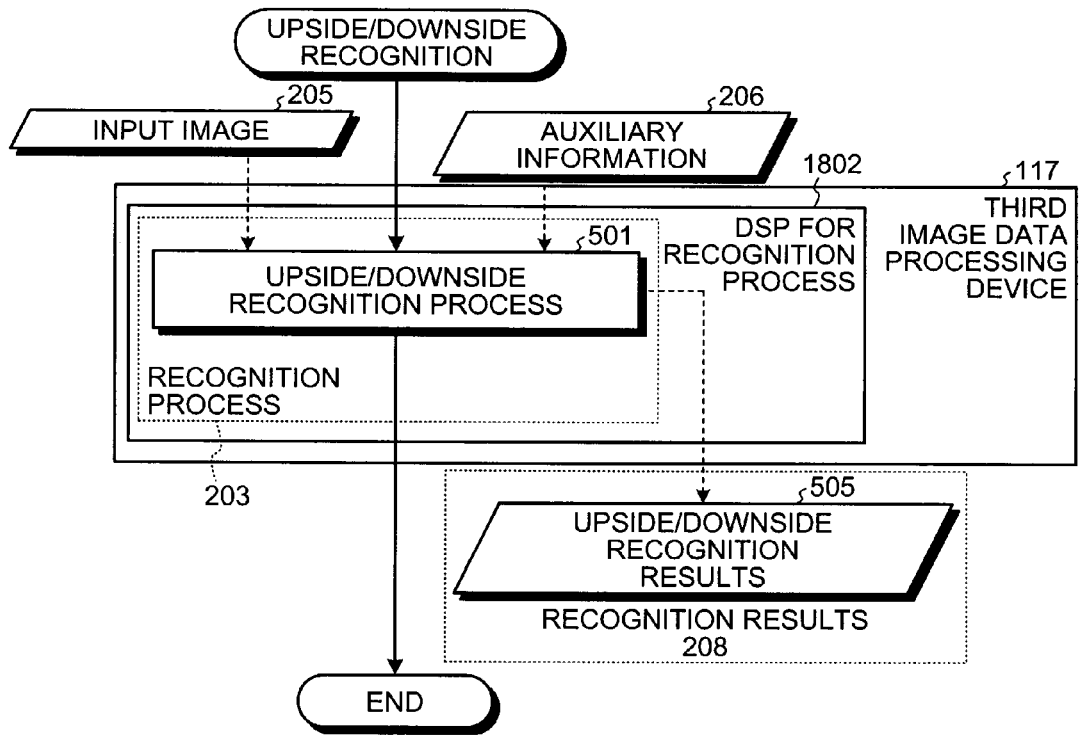
Figure 32:
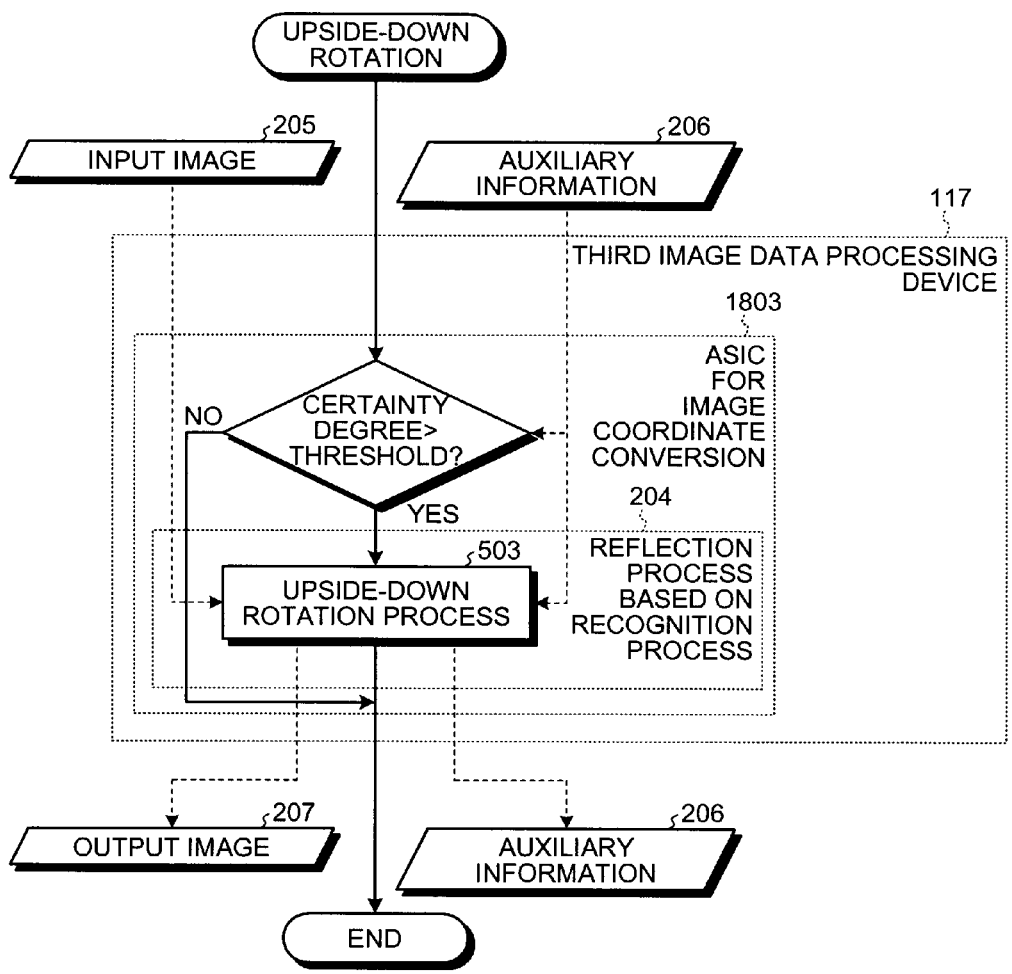

FIG. 27 is a drawing of the configuration including a third image data processing device, which is an optional hardware component of the image processing apparatus according to the sixth embodiment of the present invention. FIGS. 28 and 29 are drawings of the configuration of the second and third image data processing devices. FIGS. 30 to 32 are flow diagrams of procedures of the second and third image data processing devices.

With the configuration in which the second image data processing device 104 performs an image correction process and a recognition reflection process, superfluous functions are provided for users not requiring a recognition reflection process, thereby decreasing cost performance. The image correction process is a requisite process since this process is to improve the image quality of the output image. The recognition reflection process, on the other hand, is a process to be performed upon selection by the user. In view of this, the configuration is such that the requisite image correction process is performed by the second image data processing device, and the recognition reflection process is performed by the optional third image data processing device. As depicted in FIG. 27, an optional third image data processing device 117 is provided to a controller unit. The third image data processing device 117 is, for example, an option board connectable to a PCI-Express bus, and can be freely removed and mounted.

FIGS. 28 and 29 depict middleware and hardware of the second image data processing device and the third image data processing device. The second image data processing device 104 performs only an optimal image process to correct the image in various applications, such as copy, scanner, facsimile, print, and accumulation applications. The second image data processing device 104 has implemented therein an ASIC 1801 for image correction process. Since the recognition process (step 203), such as an upside/downside process or a skew correction process, is not performed, the circuit size is small. The third image data processing device 117 has implemented therein a DSP for recognition process 1802 for recognition process and an ASIC for image coordinate conversion 1803 for reflecting the recognition process.

FIGS. 30 to 32 depict the processes of the second and third image data processing devices. In the second image data processing device 104, the filtering process (step 201) and the γ process (step 202) are performed at the ASIC 1801 for image correction. The third image data processing device 117 has implemented therein the DSP for recognition process 1802 for achieving the upside/downside identification process (step 501) and the ASIC for image coordinate conversion 1803 for achieving the upside-down rotation process (step 503). The order of processing the input image 205 and the auxiliary information 206 is as follows. The recognition process (step 203) is performed at the third image data processing device 117, an image correction process is performed at the second image data processing device 104, and finally a process of reflecting the recognition process (step 204) is performed at the third image data processing device 117.

In the MFP device including the third image data processing device 117, the recognition process (step 203) and a reflection process (step 204) based on the results of the recognition process are performed at the third image data processing device 117. The third image data processing device 117 includes the DSP for recognition process 1802 for performing the recognition process (step 203) and the ASIC for image coordinate conversion 1803 for performing image coordinate conversion based on the results of the recognition process. With this configuration, only the user desiring an upside/downside identification process or a skew correction process to be performed at the MFP device can be provided with functions therefor as options, thereby increasing cost performance.

As explained above, in the sixth embodiment of the present invention, the image processing apparatus is configured such that a recognition process and a reflection process are performed at the third image data processing device. With this, process efficiency is increased.

An image processing apparatus according to a seventh embodiment of the present invention is such that separated data is used to perform a recognition process and a reflection process.

Figure 33:
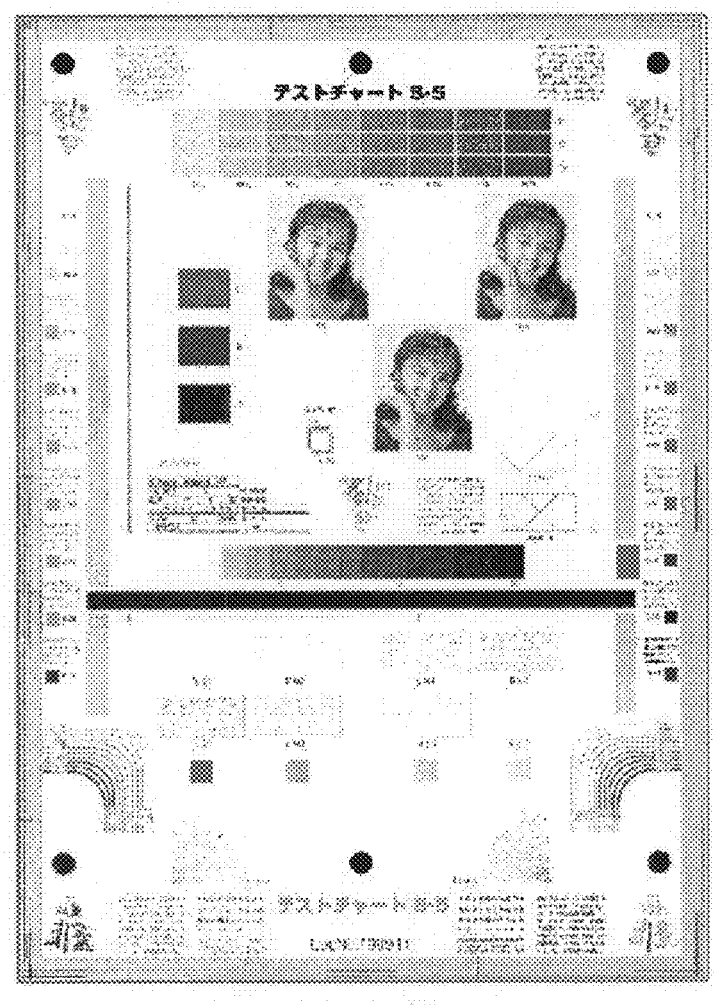
FIGS. 33 and 34 are drawings of an input image and separated data of an image processing apparatus according to a seventh embodiment of the present invention.
Figure 34:
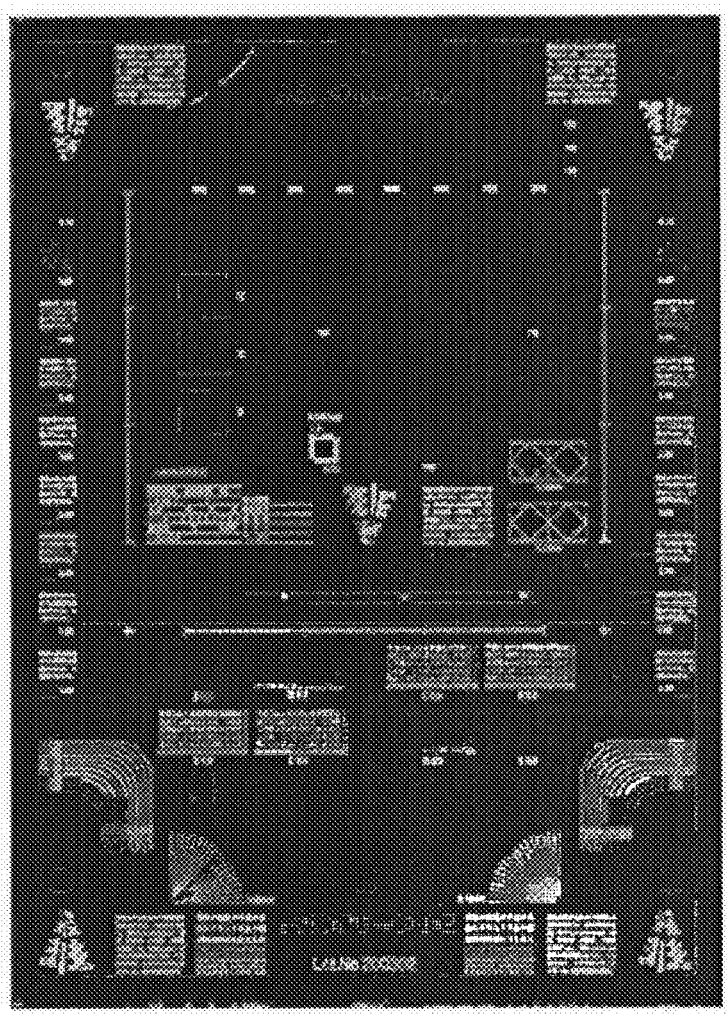
Figure 35:
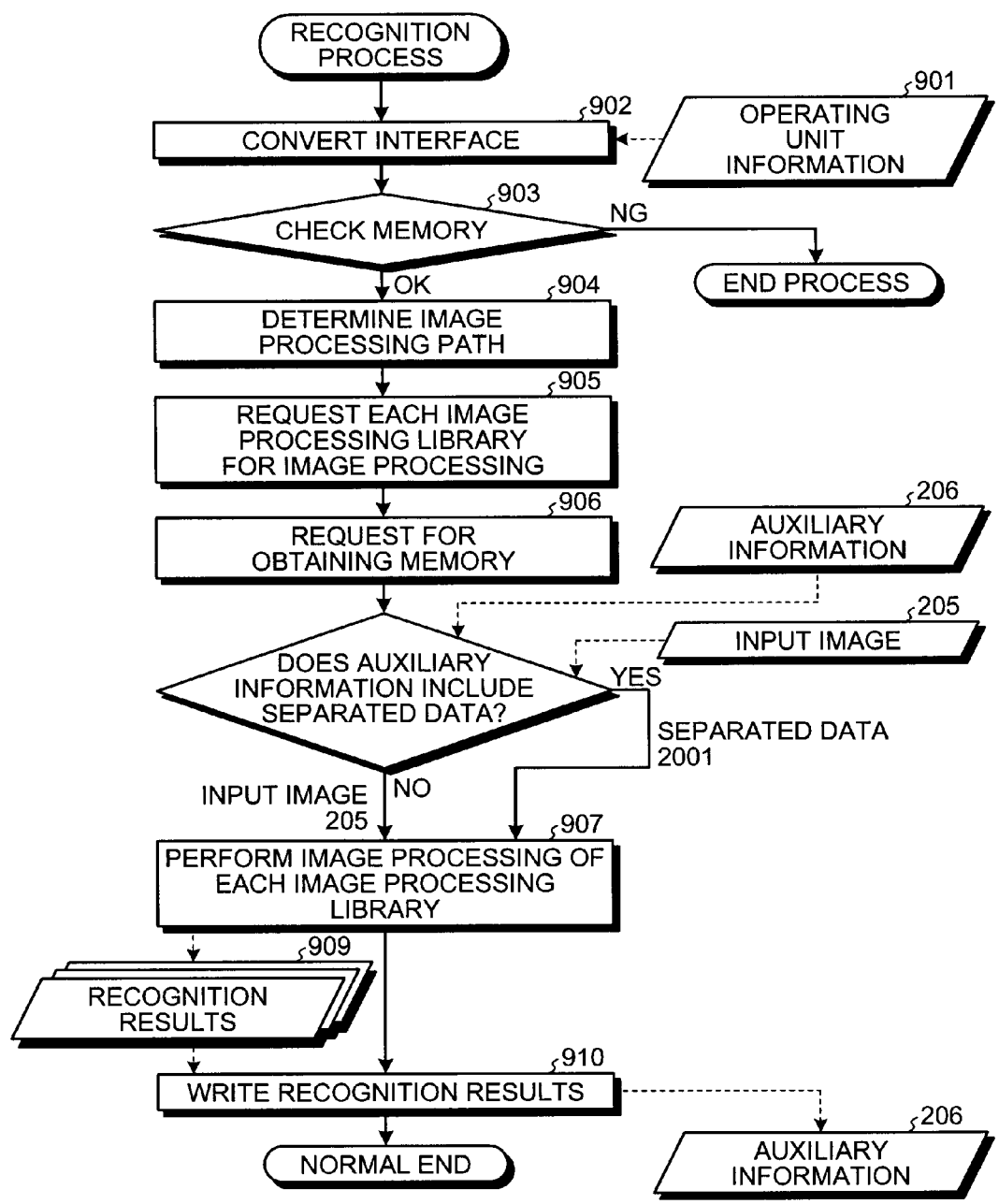
FIGS. 35 and 36 are flow diagrams of procedures of an image processing controlling unit of the image processing apparatus according to the seventh embodiment.
Figure 36:
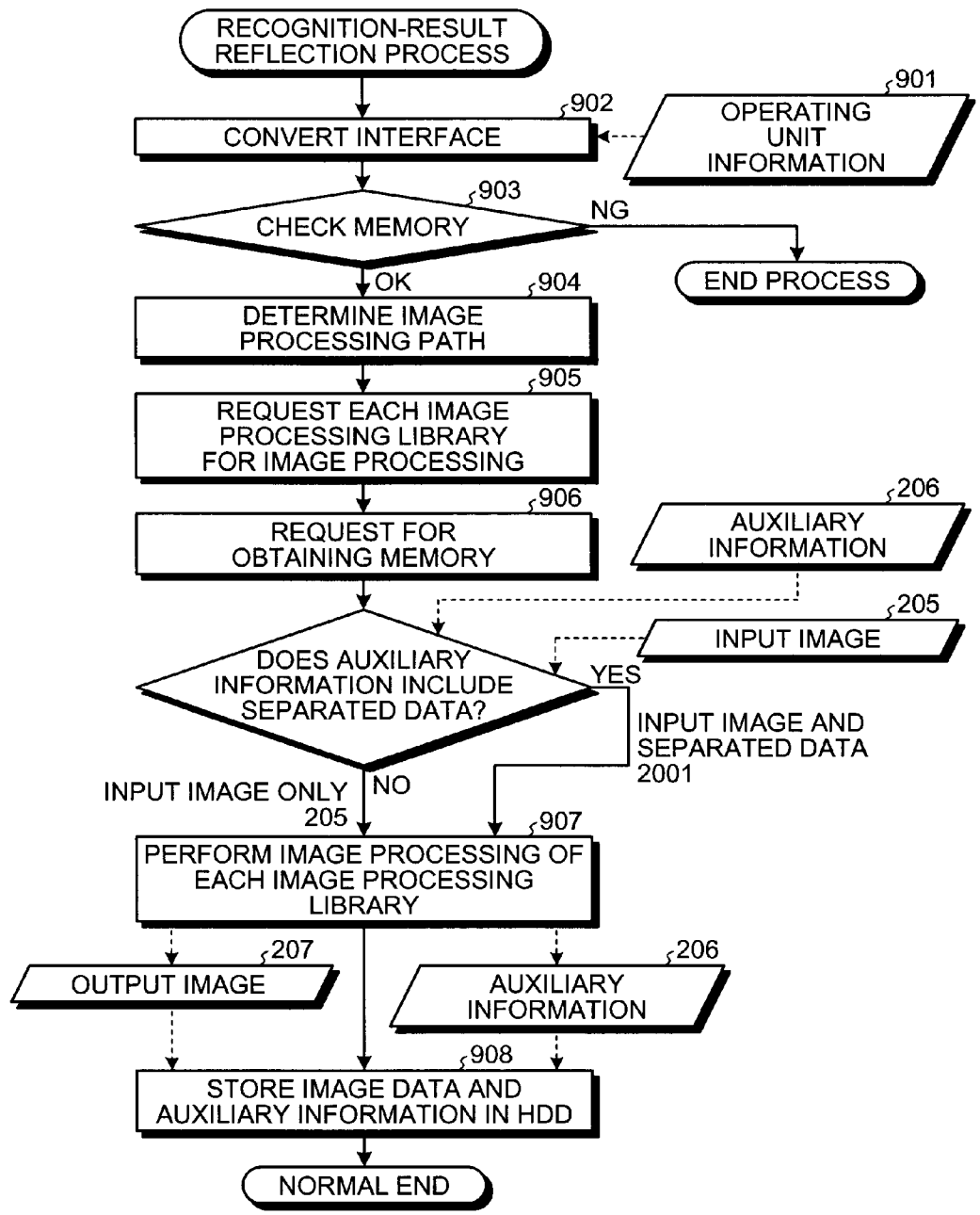

FIGS. 33 and 34 are drawings of an input image and separated data of the image processing apparatus according to the seventh embodiment of the present invention. FIGS. 35 and 36 are flow diagrams of procedures of an image processing controlling unit.

FIGS. 33 and 34 depict an input image and separated data. The first image data processing device 102 performs a character/non-character separation process on the input image depicted in FIG. 33, and the separation results are depicted in FIG. 34 as separated data, which is binary data with characters being represented in white and non-characters (background) being represented in black. The results of the separation process performed in the first image data processing device 102 are also used for an image correction process at the second image data processing device 104. Therefore, the separation process is a process always required for the MFP device. In the recognition process (step 203), the already-existing separated data is used without extracting character areas from the input image, thereby omitting a binarization process. With this, the process can be speeded up.

FIGS. 35 and 36 depict process flows of the image processing controlling unit 801. This process represents a method of switching a recognition process depending on the presence or absence of separated data. Separated data 2001 present in the auxiliary information 206 is generated by the first image data processing device 102. The configuration of the image processing controlling unit 801 is as depicted in FIG. 11.

In a sequence of a recognition process depicted in FIG. 35, the operating unit information 901 specified by the user is subjected to interface conversion (step 902). Then, the interface-converted information is transferred to the manager 803 together with the input image 205 and the auxiliary information 206. Then, the memory managing unit 804 checks the memory (step 903), where the implemented memory capacity is checked to determine whether image processing can be performed by software. If the determination result indicates OK, the procedure continues. If it is determined that processing cannot be made, the procedure ends. Then, it is determined whether the auxiliary information 206 includes the separated data 2001. The presence or absence of separated data is also included as a condition for processability determination according to the memory capacity. If separated data is present, an area for generating a binary image is not required, and therefore the presence or absence of the separated data 2001 is added to determination conditions. As for the auxiliary information 206, memory check information is transferred from the manager 803 to the memory managing unit 804. If it is determined that there is no problem with the memory capacity for performing image processing by software, the procedure goes to the next process.

The manager 803 requests the path managing unit 805 to determine an image processing path (step 904). The path managing unit 805 then determines an image processing path based on the operating unit information 901. Also for the path managing unit 805, the presence or absence of the separated data is included in determination conditions for determining a path. If separated data is present, binarization is not required, and therefore the contents of the path are changed. When the upside/downside identification process (step 501) is requested from the user, an upside/downside identification process (recognition) is selected as an image processing path. Next, according to the image processing path determined by the path managing unit 805, the manager 803 selects a necessary library from the image processing library group 806 for performing the process.

The manager 803 determines whether the separated data 2001 is present, and selects whether either one of the input image 205 or the separated data 2001 is input in an upside/downside identification process (recognition). If the separated data 2001 is present, the recognition process (step 203) is requested with the separated data 2001 as an input. In the upside/downside identification process (recognition), a process of determining an upside/downside identification is performed based on the separated data 2001 sent from the manager 803. A direction and a certainty degree, which are recognition results 909 of the upside/downside identification process, are output. The manager 803 then writes the results output from the library in the auxiliary information 206, and then ends the process. In this example, since a process by a binarized library is not selected, a request for obtaining memory (step 906) is not issued. However, depending on the recognition process (step 203), image processing is performed by using the memory 107. Therefore, the process depends on an image processing library that is present in the image processing path.

A process of reflecting the recognition process depicted in FIG. 36 is approximately identical to that of FIG. 35, and identical portions are not explained herein. A difference is that the auxiliary information 206 is used in determining the image processing path (step 904) of the path managing unit 805. Also in consideration of a certainty degree of an upside/downside identification process of the auxiliary information 206, whether to add an upside/downside identification (rotation) process to the image processing path is determined. If the certainty degree is above a certain threshold and a determination is made that a rotation process is to be performed, the process is added to the image processing path.

In a performing process at the library (step 907), the rotating direction result included in the auxiliary information 206 is used to perform an image rotation process in the case of the upside/downside identification (rotation) process. Also in the process of reflecting the recognition process, as with the recognition process, whether the separated data 2001 is present is checked. In the process of reflecting the recognition process, as a matter of course, the reflection process is performed on the input image 205. If the separated data 2001 is present, as with the input image 205, the process of reflecting the recognition process is performed on the separated data 2001. For information corresponding to image position information, if positional conversion, such as a rotation process, is performed, the position will not be matched, and therefore an upside/downside identification (rotation) process is performed similarly. When a request from the operating unit information 901 specifies an HDD accumulation application for the output image 207 and the auxiliary information 206, the results after image processing are stored in the HDD 105. From the manager 803 to the memory managing unit 804, an HDD writing request is issued, and then the memory managing unit 804 performs HDD storing (step 908) by writing the output image 207 and the auxiliary information 206 in the HDD 105, thereby ending the process.

As explained above, in the seventh embodiment of the present invention, the image processing apparatus is such that the separated data is used to perform a recognition process and a reflection process. With this, the process can be performed at high speed with a small memory capacity.

With the configuration explained above, the image processing apparatus with such a simple configuration can accurately recognize the state of image data and can perform an optimum correction process according to the use purpose at high speed. That is, for image data with unified characteristics, an optimum recognition process can be performed with a single method. Therefore, the apparatus configuration and program structure can both be simplified.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a first image data processing unit that processes an image quality of image data output from an image reading unit so that the image quality matches with a predetermined unified standard, generates input image data with a predetermined image quality and auxiliary information thereof, and comprises a central processing unit (CPU) operating according to a program stored in a non-transitory computer-readable medium;
a memory unit that accumulates the input image data and the auxiliary information;
a second image data processing unit that processes the input image data and the auxiliary information to generate output image data suitable for a target output unit; and
an external interface unit that connects a client information processing apparatus via a network, wherein
the second image data processing unit includes an image recognizing unit and a reflecting unit that comprise at least one of a CPU operating according to a program stored in a non-transitory computer-usable medium, a digital signal processor (DSP) operating according to a program downloaded in a non-transitory computer-usable medium, and an application-specific integrated circuit (ASIC),
the image recognizing unit performs a recognition process in which the image recognizing unit recognizes a state of the input image data and outputs the recognition result,
the reflecting unit performs a reflection process in which the recognition result is reflected on the input image data,
the second image data processing unit further includes a switching unit that comprises a CPU operating according to a program stored in a non-transitory computer-readable medium and that switches whether to perform the recognition process or to perform no recognition process based on a configuration of the image processing apparatus, switches whether to perform the reflection process or not to perform any process to reflect the recognition result on the input image data based on the recognition result and/or the configuration of the image processing apparatus, switches whether to perform the recognition process and/or the reflection process by the CPU, the DSP, or the ASIC based on the configuration of the image processing apparatus, and/or switches a procedure of the recognition process based on the auxiliary information, and
the switching unit includes a unit that switches a procedure of the recognition process according to whether the auxiliary information includes separated data with a character and a non-character area separated from the input image data so as to cause the image recognizing unit to extract character areas from the input image data when the auxiliary information does not include the separated data, and to cause the image recognizing unit not to extract character areas from the input image data when the auxiliary information includes the separated data.

2. The image processing apparatus according to claim 1, wherein the image recognizing unit includes a unit that finds a certainty degree of the recognition result that indicates how certain the recognition result is, and the switching unit includes a unit that determines whether to perform the reflection process according to the certainty degree of the recognition result.

3. The image processing apparatus according to claim 1, wherein the switching unit includes a unit that determines that the recognition process and/or the reflection process is not to be performed when a storage capacity is not enough to perform the recognition process and/or the reflection process.

4. The image processing apparatus according to claim 1, wherein the switching unit includes a unit that determines that the recognition process and/or the reflection process is not to be performed when a storage capacity is not enough to perform the recognition process and/or the reflection process at a resolution and a size of the input image data.

5. The image processing apparatus according to claim 1, wherein the switching unit includes a unit that determines that the recognition process and the reflection process is not to be performed when optional hardware, which can be removed from and mounted to the image processing apparatus and comprises the image recognizing unit and the reflecting unit, is not mounted.

6. The image processing apparatus according to claim 1, wherein the image recognizing unit includes an upside/downside identifying unit that identifies an upside and a downside of the input image data and a skew detecting unit that detects a tilt of the input image data, and the reflecting unit includes an upside/downside rotating unit that rotates the input image data so as to correct the upside and the downside of the input image data and a skew correcting unit that eliminates the tile of the input image data.

7. An image processing system comprising:
an image processing apparatus having a first image data processing unit, a memory unit, and a second image data processing unit; and
a client information processing apparatus connected to the image processing apparatus via a network, wherein
the first image data processing unit including a central processing unit (CPU) operating according to a program stored in a non-transitory computer-readable medium and includes a unit that processes an image quality of image data output from an image reading unit so that the image quality matches with a predetermined unified standard and generates input image data with a predetermined image quality and auxiliary information thereof,
the memory unit includes a unit that accumulates the input image data and the auxiliary information,
the second image data processing unit is a unit that processes the input image data and the auxiliary information to generate output image data suitable to a target output unit, and includes an image recognizing unit and a reflecting unit that comprise at least one of a CPU operating according to a program stored in a non-transitory computer-usable medium, a digital signal processor (DSP) operating according to a program downloaded in a non-transitory computer-usable medium, and an application-specific integrated circuit (ASIC),
the image recognizing unit recognizes a state of the input image data and outputs the recognition result,
the reflecting unit performs a reflection process in which the recognition result is reflected on the input image data,
the second image data processing unit further includes a switching unit comprising a CPU operating according to a program stored in a non-transitory computer-usable medium and that switches whether to perform the recognition process or to perform no recognition process based on a configuration of the image processing apparatus, switches whether to perform the reflection process or not to perform any process to reflect the recognition result on the input image data based on the recognition result and/or the configuration of the image processing apparatus, switches whether to perform the recognition process and/or the reflection process by the CPU, the DSP, or the ASIC based on the configuration of the image processing apparatus, and/or switches a procedure of the recognition process based on the auxiliary information,
the client information processing apparatus includes a CPU operating according to a program stored in a non-transitory computer-readable medium and includes a unit that receives the input image data and the auxiliary information from the image processing apparatus, a client image recognizing unit that recognizes a state of the input image data and outputs the recognition result, and a client reflecting unit that reflects the recognition result on the input image data, and a unit that transmits the reflection result to the image processing apparatus, and
the switching unit includes a unit that switches a procedure of the recognition process according to whether the auxiliary information includes separated data with a character and a non-character area separated from the input image data so as to cause the image recognizing unit to extract character areas from the input image data when the auxiliary information does not include the separated data, and to cause the image recognizing unit not to extract character areas from the input image data when the auxiliary information includes the separated data.

8. The image processing system according to claim 7, wherein the client information processing apparatus includes a unit that controls the client image recognizing unit so that, if the received auxiliary information does not include the recognition result, the client image recognizing unit recognizes a state of the input image data and finds the recognition result.

9. The image processing system according to claim 7, wherein the client information processing apparatus includes a unit that controls the client image recognizing unit so that, if the input image data received has not been subjected to the reflection process, the client image recognizing unit recognizes a state of the input image data and finds the recognition result, and also controls the client reflecting unit so that the client reflecting unit reflects the recognition result on the input image data.

10. The image processing system according to claim 7, wherein the client information processing apparatus includes a unit that controls not to perform a reflection process if a certainty degree of the recognition result, which indicates how certain the recognition result is, from the client image recognizing unit is lower than a threshold.

11. The image processing system according to claim 7, wherein the client information processing apparatus includes a unit that sets by a user a user determination result as data corresponding to the recognition result, and a unit that controls the client reflecting unit that the user determination result is reflected on the input image data.

12. An image processing method, performed by an image processing apparatus, the method comprising:
processing, by a central processing unit (CPU), an image quality of image data output from an image reading unit so that the image quality matches with a predetermined unified standard, to generate and accumulate input image data with a predetermined image quality and auxiliary information thereof; and
processing the input image data and the auxiliary information to generate output image data suitable for a target output unit, wherein
the processing the input image data and the auxiliary information includes a recognition process in which a state of the input image data is recognized, by at least one of a CPU, a digital signal processor (DSP), and an application-specific integrated circuit (ASIC) included in the image processing apparatus, for output of the recognition result, and a reflection process in which the recognition result is reflected, by the CPU, the DSP, or the ASIC, on the input image data, whether to perform the recognition process or to perform no recognition process is switched based on a configuration of the image processing apparatus, whether to perform the reflection process or not to perform any process to reflect the recognition result on the input image data is switched based on the recognition result and/or the configuration of the image processing apparatus, whether to perform the recognition process and/or the reflection process by the CPU, the DSP, or the ASIC as a unit used to perform the recognition process is switched based on the configuration of the image processing apparatus, and/or a procedure of the recognition process is switched based on the auxiliary information, by a CPU, and a procedure of the recognition process is switched according to whether the auxiliary information includes separated data with a character and a non-character area separated from the input image data so as to cause the image recognizing unit to extract character areas from the input image data when the auxiliary information does not include the separated data, and to cause the image recognizing unit not to extract character areas from the input image data when the auxiliary information includes the separated data.

13. The image processing method according to claim 12, wherein whether to perform the recognition process and/or the reflection process is switched such that the recognition process and/or the reflection process is not performed when a storage capacity is not enough to perform the recognition process and/or the reflection process.

14. The image processing method according to claim 12, wherein whether to perform the recognition process and/or the reflection process is switched such that the recognition process and/or the reflection process is not performed when a storage capacity is not enough to perform the recognition process and/or the reflection process at a resolution and a size of the input image data.

15. The image processing method according to claim 12, wherein an upside and a downside of the input image data are identified, the input image data is rotated through a reflection process so as to correct the upside and the downside of the input image data, a tilt of the input image data is detected to be eliminated through the reflection process.

16. The image processing method according to claim 12, wherein the output image data and the auxiliary information are transmitted to a client information apparatus via a network; if the auxiliary information received by the client information processing apparatus does not include the recognition result and if the output image data has not been subjected to the reflection process, a state of the output image data is recognized and the recognition result is found by the client information apparatus; the recognition result is reflected on the input image data by the client information apparatus; if a certainty degree of the found recognition result is lower than a threshold, the reflection process is not performed by the client information apparatus; and if a user sets a user determination result, the user determination result is reflected on the input image data by the client information apparatus.

* * * * *